(12) United States Patent
de Dood

(10) Patent No.: US 10,657,215 B2
(45) Date of Patent: May 19, 2020

(54) COMPUTER IMPLEMENTED SYSTEM AND METHOD FOR GENERATING A LAYOUT OF A CELL DEFINING A CIRCUIT COMPONENT

(71) Applicant: Arm Limited, Cambridge (GB)

(72) Inventor: Paul Christopher de Dood, Pleasanton, CA (US)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/253,075

(22) Filed: Jan. 21, 2019

(65) Prior Publication Data

US 2019/0155978 A1 May 23, 2019

Related U.S. Application Data

(63) Continuation of application No. 15/601,707, filed on May 22, 2017, now Pat. No. 10,185,796, which is a continuation of application No. 14/165,623, filed on Jan. 28, 2014, now Pat. No. 9,659,125.

(51) Int. Cl.
*G06F 17/50* (2006.01)

(52) U.S. Cl.
CPC ...... *G06F 17/5068* (2013.01); *G06F 2217/02* (2013.01)

(58) Field of Classification Search
USPC ........................................................ 716/122
See application file for complete search history.

(56) References Cited

U.S. PATENT DOCUMENTS

| 5,619,420 | A  | 4/1997  | Breid |
| 7,818,703 | B2 | 10/2010 | Andreev et al. |
| 8,863,051 | B2 | 10/2014 | Kauth et al. |
| 10,083,269 | B2 | 9/2018 | De Dood et al. |

(Continued)

Primary Examiner — Mohammed Alam
(74) Attorney, Agent, or Firm — Pramudji Law Group PLLC; Ari Pramudji

(57) ABSTRACT

The present invention provides a system and computer implemented method for generating a layout of a cell defining a circuit component, the layout providing a layout pattern for a target process technology. In accordance with the method, a process technology independent layout representation associated with the circuit component is input, the process technology independent layout representation being defined within a grid array providing a plurality of grid locations. A mapping database is provided having a priority ordered list of mapping entries, each mapping entry storing a process technology independent layout section and an associated layout pattern section for the target process technology. For selected grid locations within the grid array, a lookup operation is performed in the mapping database to determine a matching mapping entry, the matching mapping entry being a highest priority mapping entry within the priority ordered list whose process technology independent layout section matches a portion of the process technology independent layout representation at that selected grid location. The layout of the cell is then generated by incorporating, at each of the selected grid locations, the layout pattern section for the target process technology stored in the matching mapping entry. This provides an automated mechanism for generating cells whose layouts conform to a target process technology.

20 Claims, 17 Drawing Sheets

(56) References Cited

U.S. PATENT DOCUMENTS

| | | | |
|---|---|---|---|
| 2006/0036977 A1* | 2/2006 | Cohn | G06F 30/398 |
| | | | 716/51 |
| 2006/0217916 A1 | 9/2006 | Cheng et al. | |
| 2007/0044060 A1* | 2/2007 | Waller | G06F 30/398 |
| | | | 716/52 |
| 2008/0222578 A1 | 9/2008 | Joshi | |
| 2009/0007042 A1* | 1/2009 | Broberg | G06F 8/20 |
| | | | 716/118 |
| 2009/0235215 A1* | 9/2009 | Lavin | G06F 30/394 |
| | | | 716/106 |
| 2014/0130003 A1 | 5/2014 | Cheuh et al. | |
| 2014/0353842 A1 | 12/2014 | Yuan et al. | |
| 2015/0143309 A1* | 5/2015 | De Dood | G06F 30/398 |
| | | | 716/107 |
| 2015/0213177 A1* | 7/2015 | De Dood | G06F 30/39 |
| | | | 716/122 |
| 2017/0255734 A1* | 9/2017 | de Dood | G06F 30/39 |

\* cited by examiner

LOG AFTER COMPLETION OF PROCESS OF FIG 5A

| GRID LOCATION (392) | MATCHING MAPPING ENTRIES (394) | LOCATION ENABLED/DISABLED (396) |
|---|---|---|
| 0,0 | | |
| 0,1 | | |
| ⋮ | | |
| M,M | | |

COMPUTER IMPLEMENTED SYSTEM AND METHOD FOR GENERATING A LAYOUT OF A CELL DEFINING A CIRCUIT COMPONENT

CROSS-REFERENCE TO RELATED APPLICATIONS

This application is a continuation of U.S. patent application Ser. No. 15/601,707, filed 2017 May 22, which is a continuation of U.S. patent application Ser. No. 14/165,623, filed 2014 Jan. 28 and issued as U.S. patent Ser. No. 10/185,796, which are herein incorporated by reference.

FIELD OF THE INVENTION

The present invention relates to a computer implemented system and method for generating a layout of a cell defining a circuit component.

DESCRIPTION OF THE PRIOR ART

When producing integrated circuits, a number of process layers are formed on a substrate, each process layer incorporating a layout pattern. The layout patterns within the various layers establish component features and interconnections such that once the final process layer has been formed, an integrated circuit has been produced containing all of the required circuit components interconnected in the manner required to perform the functions of the integrated circuit.

For a new integrated circuit, a layout of that integrated circuit will be produced in the form of a data file identifying the required layout patterns for each of the process layers. To assist in the generation of such a layout, it is known to use cell libraries providing a plurality of different cells, each cell defining a layout for a particular component. Various types of cells are used in modern systems for generating integrated circuit layouts, for example standard cells, datapath cells, custom cells, cells representing portions of a memory device, etc. For the purposes of the following discussions, the standard cell example will be referred to.

A standard cell library will provide a plurality of standard cells, each standard cell defining a layout for a particular circuit component. The circuit components for which standard cells are developed are typically the basic building block components used to construct more complex circuits within the integrated circuit, and hence for example standard cells may be generated for AND gates, NAND gates, OR gates, NOR gates, inverters, flops, etc.

Once a standard cell library has been produced for a particular process technology, then the design of integrated circuits for that process technology can be simplified. For example, it is known to provide automated tools which use a functional design of a planned integrated circuit (for example in the form of a gate level net list or a Register Transfer Language (RTL) higher level representation of the design) and a standard cell library in order to generate the layout of the planned integrated circuit.

Typically, the standard cells are arranged in rows by the automated tool and (considering the rows as running horizontally) the left and right boundaries of each standard cell are such that any given standard cell may be placed next to any other given standard cell. Thus the automated tool has free choice as to which standard cells are placed where in order to fulfil the requirements of the functional design with a low routing overhead. This process is illustrated schematically in FIG. 13, which illustrates a portion 700 of an integrated circuit layout, the portion shown having three rows of a fixed row height 725. Each row comprises a series of blocks 720 with a fixed unit of width 730. Each standard cell in the standard cell library is arranged to have a height equal to the row height 725, and to have a width which can vary between cells but is a multiple of the unit width 730. Standard cells are then placed into each row having regards to the required circuit elements and connections between those circuit elements required by the integrated circuit, with the various standard cells arranged to abut against one another. For the purpose of illustration, three standard cells 740, 750, 760 are shown located within one of the rows.

For each type of component having an associated standard cell, it is often the case that multiple versions of the standard cell are produced to cover different forms of that component type. For example, considering a NAND gate, it will typically be the case that multiple standard cells will be produced to represent NAND gates having different drive strengths. As the drive strength increases, the width of the standard cell will typically become larger in order to accommodate the additional structures (for example additional gate fingers) that may be required to produce a NAND gate with the increased drive strength. Similarly, for other components such as flops, there may be a need to produce multiple different standard cells to represent the various variants of flops required, for example a scan flop, a non-scan flop, a reset flop, a non-reset flop, a retention flop, etc.

Accordingly, it will be appreciated that a large number of standard cells will typically need to be provided within the standard cell library for any particular process technology. For a different process technology, the standard cells will then need to be redesigned to ensure they conform to the design rules applicable to that process technology. With current process technologies, up to and including 20 nm technology, the design rules have been relatively straightforward, consisting essentially of an indication of the minimum width of a pattern feature, a minimum spacing between pattern features, and alignment/overlap rules used to ensure vias can be reliably produced interconnecting pattern features at different process layers. Due to the relatively simple nature of the design rules, it has been possible for the standard cells to be manually designed. Further, it has been a relatively straightforward exercise to develop additional standard cells to cover variants of a particular circuit component, such as different drive strengths NAND gates, different forms of flop, etc.

However, as the process technologies reduce below the 20 nm technology, for example in to the 14 nm domain, then the techniques used to develop each of the process layers become significantly more complex. For example, at each process layer, the number of processes required to perform the required layout patterns increases, as techniques such as double patterning are required to produce the layout pattern at such small process geometries. This results in the design rules becoming far more complicated than has traditionally been the case, setting out not only the three basic rules discussed earlier, but also requiring the specification of many different examples and exceptions. This has the result that the design of standard cells for emerging process technologies is becoming very complex. Further, at such process technologies it is no longer the case that a new variant of a particular component can readily be produced merely by a relatively simple modification to an existing standard cell. For example, whilst in current process technologies, the standard cell layout for a higher drive strength NAND gate may be readily produced by a relatively simple modification to the standard cell layout of a lower driver strength NAND gate, this is no longer the case in emerging process technologies such as 14 nm technology, and often the standard cell layouts will be very different for different variants of a particular component.

The above described problems associated with the generation of standard cells apply also to the generation of other types of cells.

Against this background, it would be desirable to provide a technique which enabled automation in the generation of cells that conform to the design rules of these emerging process technologies.

SUMMARY OF THE INVENTION

Viewed from a first aspect the present invention provides a computer implemented method of generating a layout of a cell defining a circuit component, the layout providing a layout pattern for a target process technology, the method comprising: obtaining a process technology independent layout representation associated with the circuit component, the process technology independent layout representation being defined within a grid array providing a plurality of grid locations; providing a mapping database having a priority ordered list of mapping entries, each mapping entry storing a process technology independent layout section and an associated layout pattern section for the target process technology; for selected grid locations within the grid array, performing a lookup operation in the mapping database to determine a matching mapping entry, the matching mapping entry being a highest priority mapping entry within the priority ordered list whose process technology independent layout section matches a portion of the process technology independent layout representation at that selected grid location; and generating the layout of the cell by incorporating, at each of the selected grid locations, the layout pattern section for the target process technology stored in the matching mapping entry.

In accordance with the present invention, a mapping database is provided having a priority ordered list of mapping entries, each mapping entry storing a process technology independent layout section and an associated layout pattern section for a target process technology. For a particular cell to be produced, an appropriate process technology independent layout representation can then be selected for the circuit component to be represented by the cell. A lookup process is then performed to find matching mapping entries for grid locations within the process technology independent layout representation, with the layout of the cell then being generated by incorporating, at each of those grid locations, the layout pattern section stored in the matching mapping entry.

This provides an efficient, automated, process for generating cells that conform to the design rules of the target process technology. This process can yield significant benefits when applied to emerging process technologies such as 14 nm technology, where the design rules become very complex.

The above described technique can be used to generate a layout for a variety of types of cell. However, in one embodiment the technique is used to generate the layout of a standard cell.

The selected grid locations for which the lookup process is performed can be varied, but in one embodiment the selected grid locations comprise every grid location within the grid array.

In one embodiment, at least one mapping entry within the mapping database identifies at least one grid location to be disabled if that at least one mapping entry is determined to be one of said matching mapping entries, and the layout generating step excludes from incorporation in the layout the layout pattern section stored in the matching mapping entry for any disabled grid location. By such an approach, mapping entries can be included in the mapping database which can specify a relatively large layout section that, once added to the layout, will remove the need for one or more adjacent grid locations to introduce any further layout. To ensure no additional layout patterns are added by those one or adjacent grid locations, then those one or adjacent grid locations can be disabled by the mapping entry that includes the large layout section.

The process technology independent layout representation can take a variety of forms, but in one embodiment takes the form of the so-called "stick" format of representation, also referred to as a stick diagram. A stick diagram provides a line drawn representation of the layout pattern within various layers, and includes connection points identifying where connections need to be made between layers. Such a stick diagram has no dimensions specified, and instead the stick diagram is reproduced within a grid array, with the line patterns being produced along the edges of the grids within the grid array, and with the connection points being constrained to be positioned at grid locations within the grid array. As a result, the stick diagram is entirely process technology independent.

In one embodiment, the lookup operation comprises: for each mapping entry in the mapping database, identifying every grid location where a portion of the process technology independent layout representation at that grid location matches the process technology independent layout section stored in that mapping entry, in order to produce a log identifying for each grid location a list of candidate matching mapping entries. Further, for each grid location, the matching mapping entry is selected to be the highest priority mapping entry in the associated list of candidate matching mapping entries.

In embodiments where a mapping entry may identify at least one grid location to be disabled if that mapping entry is used as a matching mapping entry, then the log may include an enable flag for each grid location which identifies whether that grid location is enabled or disabled.

There are a number of ways in which the circuit component for which a cell is desired can be specified. In one embodiment, the method further comprises receiving an input data file providing a schematic of the circuit component for which a cell is to be generated. In such an embodiment, the step of obtaining the process technology independent layout representation associated with the circuit component may involve selecting the process technology independent layout representation from a plurality of process technology independent layout representations stored in a first database, dependent on the input data file. The schematic may be described as a set of interconnected transistors (and possibly capacitors, resistors, etc.) with associated properties (width, length, threshold voltage, etc.) sufficient to characterize the electrical behavior of the circuit.

Whilst the contents of the first database may be populated manually, in an alternative embodiment an automated mechanism for populating the first database is provided. In particular, in one embodiment, the method further comprises the step of populating the first database of process technology independent layout representations by: receiving an input archetype layout of a particular cell, providing the layout pattern to be used to generate within the target process technology the circuit component defined by that particular cell; superimposing a grid array on that input archetype layout; identifying a plurality of regular-shaped sections forming the input archetype layout; transforming those regular-shaped sections into segments snapped to the grid array in order to generate a process technology independent layout representation associated with the circuit component defined by the particular cell; and storing the generated process technology independent layout representation in the first database. Such an approach enables the first database to be populated with process technology independent layout representations (for example stick diagrams) that can then be used as inputs to the earlier described process for generating cells.

In one embodiment, the step of transforming the regular-shaped sections into segments snapped to the grid array comprises, for pairs of overlapping regular-shaped sections, snapping those pairs to the grid array such that a connection between the overlapping regular-shaped sections of each pair is located at a grid location of the grid array. The regular-shaped sections can take a variety of forms, but in one embodiment are rectangles.

Whilst the mapping entries in the mapping database may be added manually, in one embodiment an automated mechanism is provided for developing the contents of the mapping database, based on the earlier-mentioned input archetype layout and the associated process technology independent layout representation generated from that input archetype layout. In particular, in one embodiment the automated mechanism comprises: providing within the mapping database an initial priority ordered list of mapping entries; receiving the process technology independent layout representation generated from the input archetype layout of the particular cell; for selected grid locations within the grid array, performing a lookup operation in the mapping database to determine a matching mapping entry, the matching mapping entry being a highest priority mapping entry within the priority ordered list whose process technology independent layout section matches a portion of the process technology independent layout representation at that selected grid location; generating a candidate layout of the particular cell by incorporating, at each of the selected grid locations, the layout pattern section for the target process technology stored in the matching mapping entry; comparing the candidate layout with the input archetype layout; and altering the priority ordered list of mapping entries within the mapping database dependent on said comparison. This provides an efficient mechanism for developing a mapping database whose mapping entries include layout sections conforming to the target process technology.

The manner in which the priority ordered list of mapping entries is altered based on a comparison of the candidate layout with the input archetype layout can vary dependent on embodiment. However, in one embodiment, the step of altering the priority ordered list comprises identifying unwanted regular shaped sections, said unwanted regular shaped sections being regular shaped sections within the candidate layout that are not fully incorporated within the layout pattern of the input archetype layout, and then for each unwanted regular shaped section determining the grid location and matching mapping entry that caused the unwanted regular shaped section to be included in the candidate layout. Then, for each unwanted regular shaped section, a new mapping entry is created within the prioritised ordered list that is of a higher priority than the matching mapping entry that caused the unwanted regular shaped section to be included in the candidate layout, that new mapping entry having a process technology independent layout section that is defined such that the new mapping entry will only be a matching mapping entry for the grid location that caused the unwanted regular shaped section to be included in the candidate layout.

Further, in one embodiment the new mapping entry is initialised with no associated layout pattern section. This effectively disables the grid location that caused the unwanted regular shaped section to be included in the candidate layout, since if the process of generating a layout from the process technology independent layout representation is now repeated with the modified mapping database, then no layout pattern will be added for the offending grid location.

In one embodiment, the process technology independent layout section for the new mapping entry is configured to contain the minimum number of segments sufficient to ensure that the new mapping entry will only be a matching mapping entry for the grid location that caused the unwanted regular shaped section to be included in the candidate layout. This maximises the chances of being able to reuse the new mapping entry in association with different process technology independent layout representations.

In one embodiment, once the above process has been performed, the method further comprises repeating the lookup operation for selected grid locations within the grid array, using the mapping database as updated by the new mapping entries, in order to generate a revised candidate layout.

Furthermore, in one embodiment, the step of altering the priority ordered list further comprises identifying absent regular shaped sections, said absent regular shaped sections being regular shaped sections within the layout pattern of the input archetype layout that are not fully incorporated within the candidate layout. Then, for each absent regular shaped section, a nearest grid location is identified, and a matching mapping entry is created for that nearest grid location that includes within the associated layout pattern section the absent regular shaped section.

In one of embodiment, in the event that there is already a matching mapping entry for said nearest grid location, the step of creating a matching mapping entry comprises modifying the existing matching mapping entry so that its associated layout pattern section is modified to include the absent regular shaped section.

Furthermore, in one embodiment, the created matching mapping entry (whether that be an entirely new matching mapping entry, or a modified matching mapping entry) is arranged to have a process technology independent layout section that is defined such that the created matching mapping entry will only be a matching mapping entry for said nearest grid location.

In one particular embodiment, the process technology independent layout section for the created matching mapping entry is configured to contain the minimum number of segments sufficient to ensure that the created matching mapping entry will only be a matching mapping entry for said nearest grid location.

In one embodiment, the step of identifying absent regular shaped sections is performed in respect of a candidate layout that does not include any unwanted regular shaped sections. Hence, in such an embodiment, the process of removing unwanted regular shaped sections is performed iteratively until a candidate layout is produced with no unwanted regular shaped sections, and then the above process is performed in order to incorporate any absent regular shaped sections that are required in order to ensure that the generated cell layout will then correspond to the input archetype layout.

Hence, once the above processes have been performed, the contents of the mapping database will be such that, if the process technology independent layout representation generated from the input archetype layout is used as an input into the cell generation process, the cell generated using the mapping entries of the mapping database will correspond exactly to the input archetype layout, and accordingly will conform to the design rules of the target process technology. Furthermore, due to the form of the mapping entries, those mapping entries can also be used to generate additional cells from further process technology independent layout representations, and those cell layouts will also conform to the target process technology.

In accordance with another embodiment, the earlier described technique for populating the first database with process technology independent layout representations based on received input archetype layouts can be extended to support process technology migration. In particular, in one embodiment, the step of populating the first database is performed for a set of input archetype layouts conforming to a first process technology in order to store within the first database a corresponding set of process technology independent layout representations. The method then further comprises providing as the priority ordered list of mapping entries within the mapping database mapping entries whose associated layout pattern sections conform to a second process technology different to said first process technology, and then performing a process technology migration operation by repeating the method of the first aspect of the present invention for each of the process technology independent layout representations in said set, in order to generate a corresponding set of layouts conforming to the second process technology. This hence provides an efficient technique for automating process technology migration.

Viewed from a second aspect, the present invention provides a computer program product on a non-transitory storage medium for controlling a computer to perform a method of generating a layout of a cell defining a circuit component in accordance with the first aspect of the present invention.

Viewed from a third aspect, the present invention provides a system for generating a layout of a cell defining a circuit component, the layout providing a layout pattern for a target process technology, the system comprising: an interface configured to obtain a process technology independent layout representation associated with the circuit component, the process technology independent layout representation being defined within a grid array providing a plurality of grid locations; a mapping database configured to store a priority ordered list of mapping entries, each mapping entry storing a process technology independent layout section and an associated layout pattern section for the target process technology; processing circuitry configured to perform, for selected grid locations within the grid array, a lookup operation in the mapping database to determine a matching mapping entry, the matching mapping entry being a highest priority mapping entry within the priority ordered list whose process technology independent layout section matches a portion of the process technology independent layout representation at that selected grid location; and the processing circuitry further configured to generate the layout of the cell by incorporating, at each of the selected grid locations, the layout pattern section for the target process technology stored in the matching mapping entry.

Viewed from a fourth aspect, the present invention provides a system for generating a layout of a cell defining a circuit component, the layout providing a layout pattern for a target process technology, the system comprising: means for providing a process technology independent layout representation associated with the circuit component, the process technology independent layout representation being defined within a grid array providing a plurality of grid locations; mapping database means for storing a priority ordered list of mapping entries, each mapping entry storing a process technology independent layout section and an associated layout pattern section for the target process technology; lookup means for performing, for selected grid locations within the grid array, a lookup operation in the mapping database means to determine a matching mapping entry, the matching mapping entry being a highest priority mapping entry within the priority ordered list whose process technology independent layout section matches a portion of the process technology independent layout representation at that selected grid location; and generating means for generating the layout of the cell by incorporating, at each of the selected grid locations, the layout pattern section for the target process technology stored in the matching mapping entry.

Viewed from a fifth aspect, the present invention provides a non-transitory storage medium storing a cell library containing one or more cell layouts generated in accordance with the method of the first aspect of the present invention.

BRIEF DESCRIPTION OF THE DRAWINGS

The present invention will be described further, by way of example only, with reference to embodiments thereof as illustrated in the accompanying drawings, in which:

FIG. 6 schematically illustrates a log that is established during the performance of the process of FIG. 5A, in accordance with one embodiment;

DESCRIPTION OF EMBODIMENTS

For the purpose of describing the following embodiments, the generation of standard cells will be considered, but the same techniques can also be applied to the generation of other types of cells, for example datapath cells, custom cells, cells representing portions of a memory device, etc.

Figure 1:
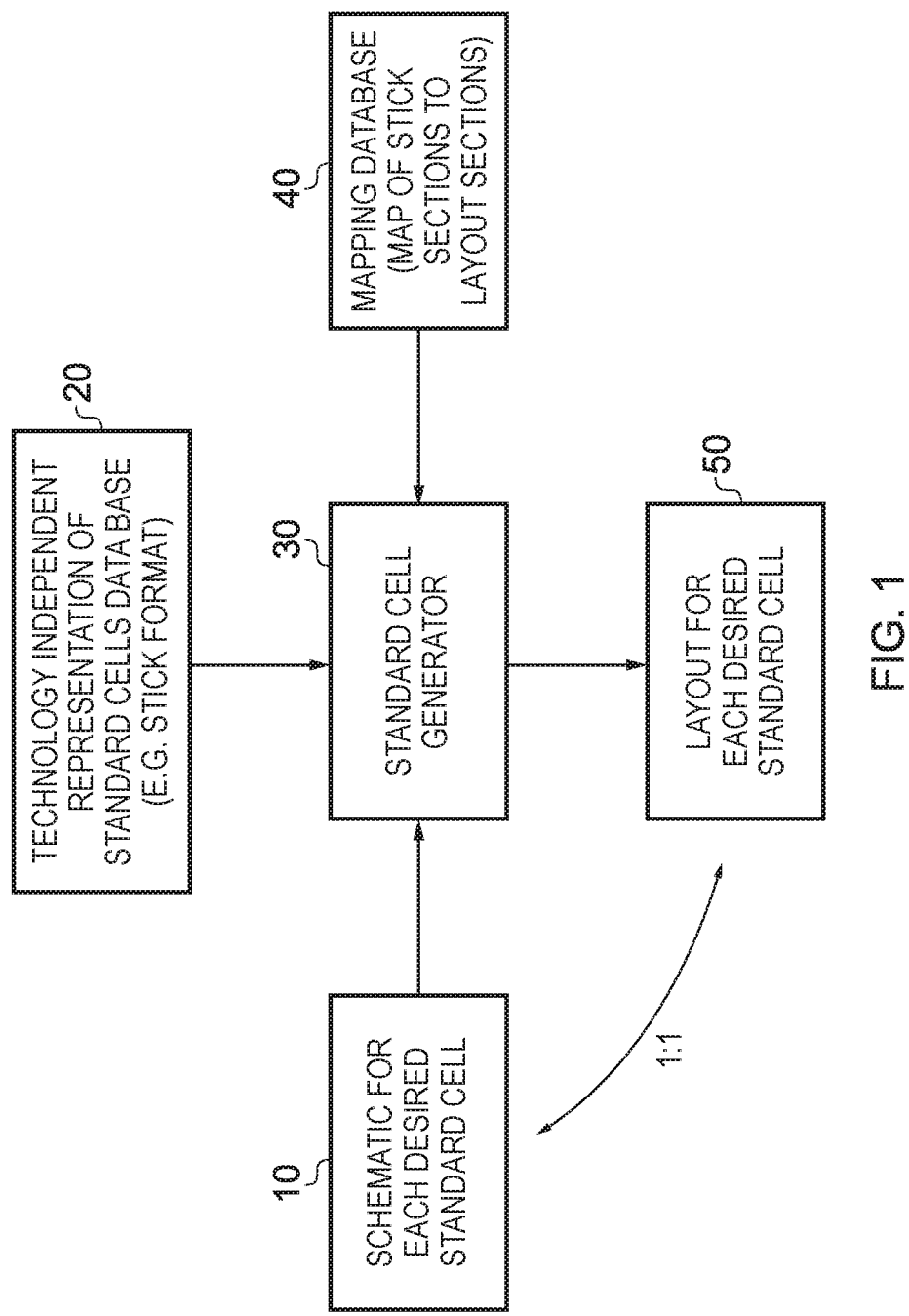
FIG. 1 is a block diagram schematically illustrating a system in accordance with one embodiment.

FIG. 1 is a block diagram schematically illustrating a system in accordance with one embodiment. A standard cell generator tool 30 is provided, which in one embodiment may take the form of a software tool executing on a computer. The standard cell generator 30 is arranged to receive a schematic for each desired standard cell to be generated. The schematic can take a variety of forms, but in one embodiment is a data file providing a logical representation of the circuit component for which a standard cell is to be produced. For example, such a schematic may identify a number of interconnected transistors (and possibly capacitors, resistors, etc.) with associated properties (width, length, threshold voltage, etc.) sufficient to characterize the electrical behavior of the circuit.

Based on a received schematic 10, the standard cell generator 30 will then perform a lookup operation within the database 20 in order to locate a technology independent representation of the standard cell to be generated. The technology independent representation can take a variety of forms, but one known representation is the so-called "stick" format of representation, also referred to as a stick diagram. A stick diagram provides a line drawn representation of the layout pattern within various layers, and includes connection points identifying where connections need to be made between layers. Such a stick diagram has no dimensions specified, and instead the stick diagram is reproduced within a grid array, with the line patterns being produced along the edges of the grids within the grid array, and with the connection points being constrained to be positioned at grid locations within the grid array. As a result, the stick diagram is entirely process technology independent.

Typically, different stick diagrams will be produced for different types of circuit components, and accordingly a stick diagram may be provided within the database for a NAND gate, a separate stick diagram for an OR gate, a separate stick diagram for a flop, etc. There is no requirement for there only to be a single stick diagram for a particular type of circuit component, and hence different stick diagrams may be produced for some different variants of a particular circuit component type, i.e. a separate stick diagram for a high drive strength NAND gate, and a separate stick diagram for a low drive strength NAND gate.

In the past, such stick diagrams have been used as inputs to compactor tools, which based on the design rules for a particular process technology, follow a sequence of steps in order to seek to generate a solution, where the solution represents a layout conforming to the design rules. However, in the emerging process technologies, such as 14 nm technology and beyond, the compactor approach no longer is able to reliably generate a solution given the complex design rules associated with such process technologies, and accordingly can no longer be used to reliably generate layouts.

Instead, in accordance with the technique described in FIG. 1, the standard cell generator tool 30 has access to a mapping database 40, the mapping database having a plurality of mapping entries, where each mapping entry stores a process technology independence layout section and an associated layout pattern section for the target process technology. Assuming stick diagrams are used within the database 20, the mapping database entries will hence store a stick format section and an associated layout pattern section. The plurality of mapping entries in the database are arranged as a priority ordered list of mapping entries. For selected grid locations within the grid array, the standard cell generator tool 30 performs a lookup operation in the mapping database 40 to seek to locate a highest priority mapping entry within the priority ordered list whose stick section matches, at that selected grid location, a portion of the stick diagram retrieved from the database 20. It is possible that more than one mapping entry may have a stick section that matches a portion of the stick diagram at the selected grid location, but in that event the highest priority mapping entry that matches is selected as the matching mapping entry to be used when generating a standard cell.

Once matching mapping entries have been identified for the grid locations, then the layout of the standard cell is produced by incorporating, at each of those grid locations, the layout pattern section stored in the matching mapping entry. This process will be described in more detail later, but once completed will result in the standard cell generator 30 outputting a layout 50 for each desired standard cell. Hence, for every schematic 10 input to the standard cell generator 30, the standard cell generator can then generate a corresponding layout 50.

Figure 2:
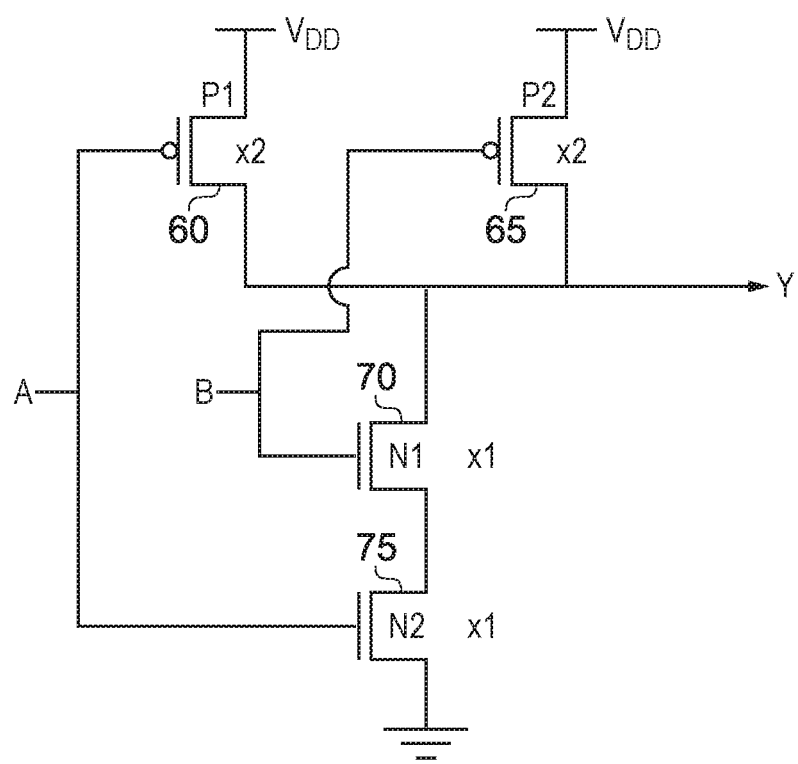
FIG. 2 illustrates an example schematic that may be provided as an input to the standard cell generator of FIG. 1 in accordance with one embodiment.

FIG. 2 provides an example of a schematic 10 that may be input to the standard cell generator 30 of FIG. 1 in accordance with one embodiment. The schematic shown in FIG. 2 is for a NAND gate, and consists of two PMOS transistors 60, 65 placed in parallel between the supply voltage and an output node, along with two NMOS transistors 70, 75 placed in series between the output node and a ground potential. Each of two inputs are provided to one of the PMOS transistors and a corresponding NMOS transistor, as shown in FIG. 2. The representation shown in FIG. 2 will typically be provided as a data file input to the standard cell generator, and will include additional data, such as specifying the drive strengths of the transistors. In this particular example, it is assumed that the PMOS transistors 60, 65 have a drive strength of two and the NMOS transistors 70, 75 have a drive strength of one.

Figure 3:
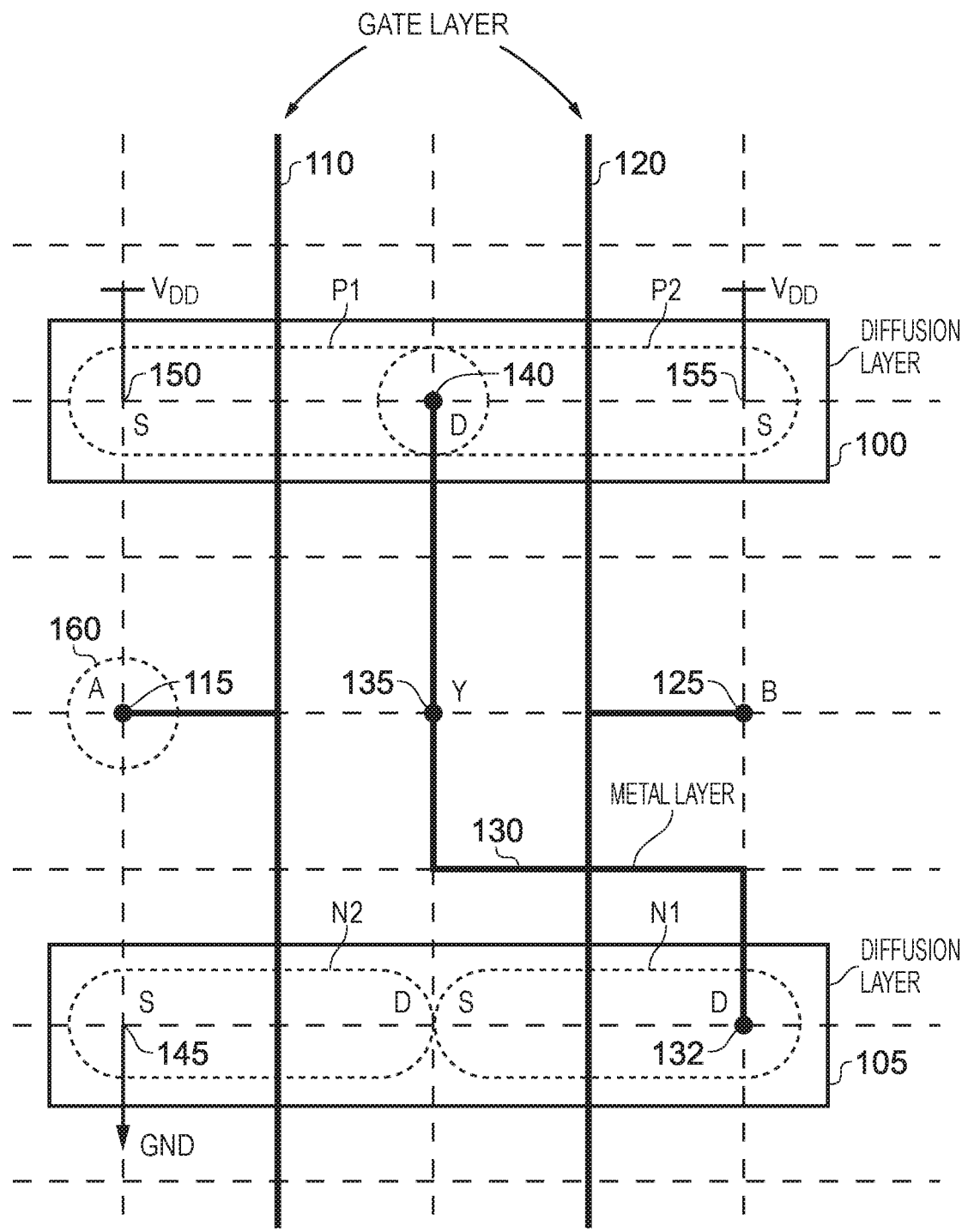
FIG. 3 illustrates an example stick format that may be selected from the stick format database by the standard cell generator of FIG. 1, when seeking to generate a standard cell layout for the schematic of FIG. 2, in accordance with one embodiment.

FIG. 3 illustrates an example stick diagram that may be retrieved from the stick database 20 by the standard cell generator 30 upon receipt of the schematic of FIG. 2. In particular, the stick diagram shown in FIG. 3 is a stick diagram for a NAND gate, and shows three layers, namely a diffusion layer, a gate layer and a metal layer. Two diffusion regions 100, 105 are shown within the diffusion layer, and then two gate lines 110, 120 are shown within the gate layer, one gate line being provided for each PMOS/NMOS transistor pair. A metal line 130 is shown within the metal layer. A connection point 135 is provided in the metal layer, to connect the metal line 130 to the output "Y". In accordance with this stick diagram format, connection point rules dictate that the connection points for the gate lines 110, 120 must be two grid squares away from any other connection point, and accordingly both of the lines 110, 120 representing the gates have a branch line out to corresponding connection points 115, 125, the connection point 115 being a connection point to the first input "A" and the connection point 125 being a connection to the second input "B".

The metal line 130 has two further connection points, namely a connection point 140 connecting the metal line to the common drain of the two PMOS transistors P1 and P2, and a connection point 132 connecting to the drain of the NMOS transistor N1. As shown schematically in FIG. 3 to illustrate context, but not strictly forming part of the stick diagram, the source regions 150 and 155 of the two PMOS transistors P1 and P2 are to be connected to the supply voltage Vdd. Similarly, the source region 145 of the NMOS transistor N2 will be connected to the ground potential.

Figure 4A:
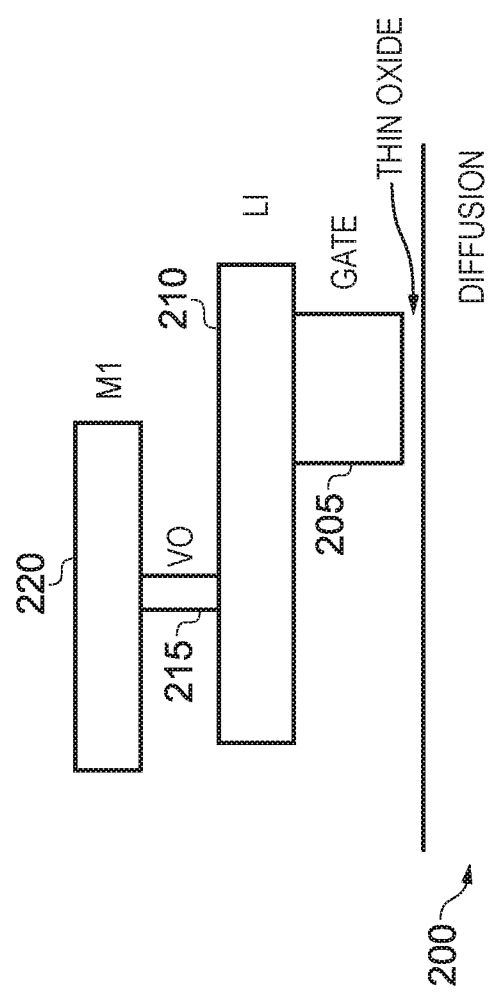
FIG. 4A schematically illustrates various process layers for which layout patterns will need to be provided within the standard cell layout.

Typically the stick diagram only illustrates a subset of the layers that are required within the generated standard cell layout. FIG. 4A schematically illustrates a few of the process layers that may be provided within a standard cell layout, and it will be appreciated that FIG. 4A is not intended to show an exhaustive list of all process layers. For example, there will be further layers above the metal 1 layer 220, and there may be more intervening layers between the metal one layer 220 and the gate layer 205 than shown in the schematic illustration of FIG. 4A. As shown in FIG. 4A, a diffusion layer 200 is provided, and this is separated by a thin oxide layer from the gate layer 205. A local interconnect layer (LI) 210 is then provided to enable patterns to be developed above the gate layer. A first via layer (V0) 215 is then provided to enable connections to be made between the local interconnect (LI) layer 210 and the metal 1 layer 220. Beyond the metal 1 layer 220, one or more further via layers may be provided to enable connections to be made between the metal 1 layer and subsequent metal layers, for example a metal 2 layer.

Figure 4B:
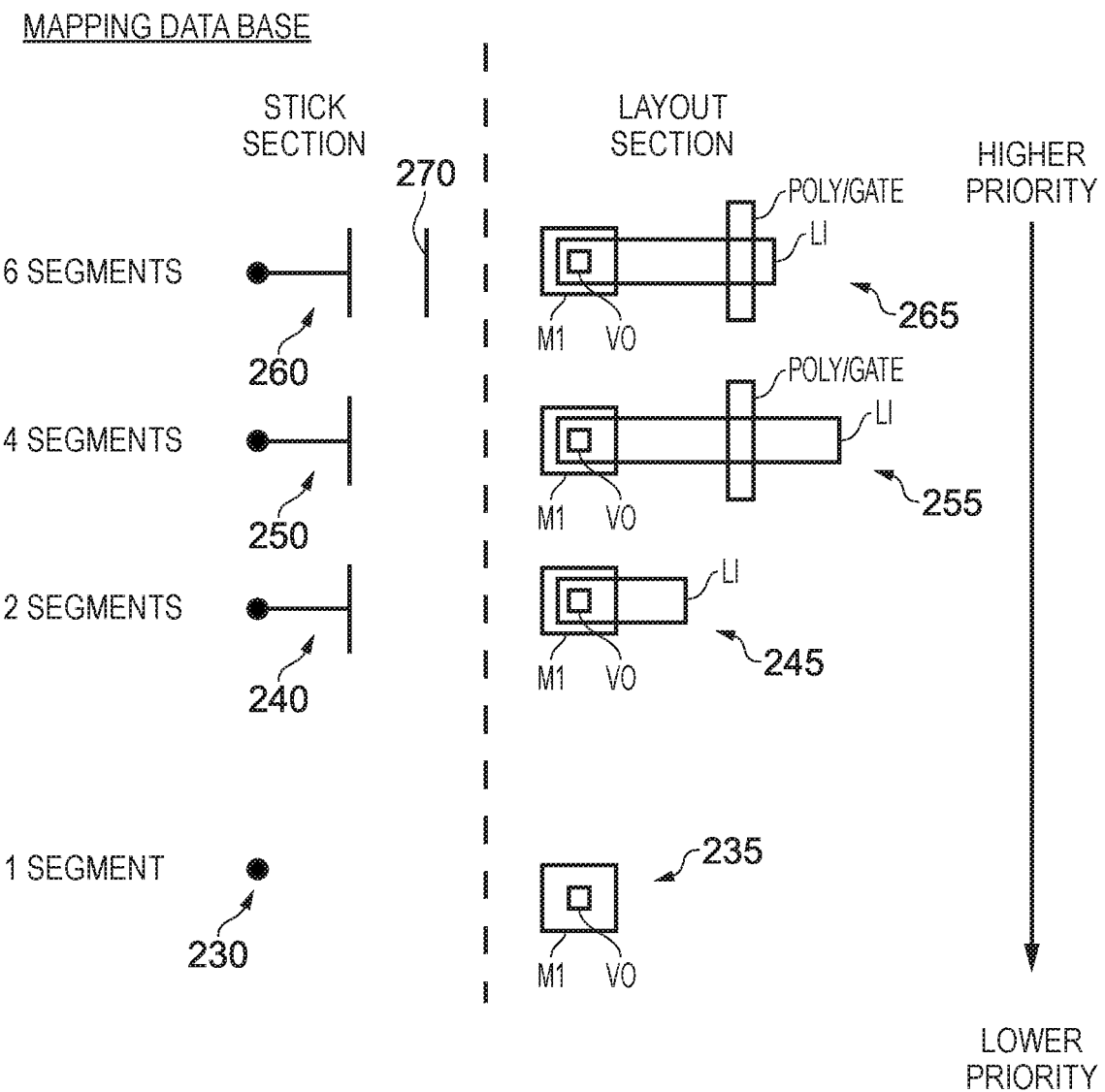
FIG. 4B schematically illustrates a number of mapping entries that may be provided within the mapping database of FIG. 1, in accordance with one embodiment.

FIG. 4B schematically illustrates mapping entries that may be provided within the mapping database 40, with the higher priority mapping entries being those towards the top of the page and the lower priority ones being those towards the bottom of the page. The particular examples illustrated in FIG. 4B are intended to identify mapping entries that might match at the grid location 160 shown in FIG. 3. At the low priority end is a stick section consisting of just a connection point 230 which will generically allow a match to be found in the mapping database for any grid location including a connection point. The corresponding layout pattern 235 may consist of a metal 1 layer square section and a smaller square first via (V0) layer section.

A higher priority entry may consist of a stick section 240 consisting of a connection point and a horizontal line. This will also match at the grid location 160 in FIG. 3, but it will be appreciated that for the particular example of the stick diagram of FIG. 3 there will be no other grid locations where this entry will match. The corresponding layout section 245 has the same metal 1 and V0 layer patterns, but includes a further rectangle at the local interconnect (LI) layer level.

A higher priority mapping entry may contain the stick section 250, which consists of a connection point, a horizontal line, and then both a vertical line above the horizontal line and a vertical line below the horizontal line. Again this will match at the grid location 160. In this example, the corresponding layout section again includes the same metal 1 and V0 layer patterns, but the local interconnect rectangle is extended, and in addition the layout section includes a gate layer pattern (also sometimes referred to as a poly layer pattern).

In the example of FIG. 4B, a further higher priority mapping entry contains a stick section 260 which additionally includes another vertical section 270. The corresponding layout section 265 is essentially the same as the layout section 255 of the lower priority entry, but in this instance the local interconnect rectangle has been trimmed back, to provide spacing with regard to some further layout to be added in relation to another grid location whose matching mapping entry identifies the layout section for the stick component 270.

Accordingly, with reference to this last example, it should be noted that the stick section can be as simple or as complex as desired, and can identify stick features that are themselves not going to have associated layout within the layout section of the entry. This enables the mapping entries in the mapping database to be modified to include high priority mapping entries that can be guaranteed to match at only once specific grid location within a particular stick diagram, this process being discussed in more detail later with reference to FIGS. 10A to 10C.

Figure 5A:
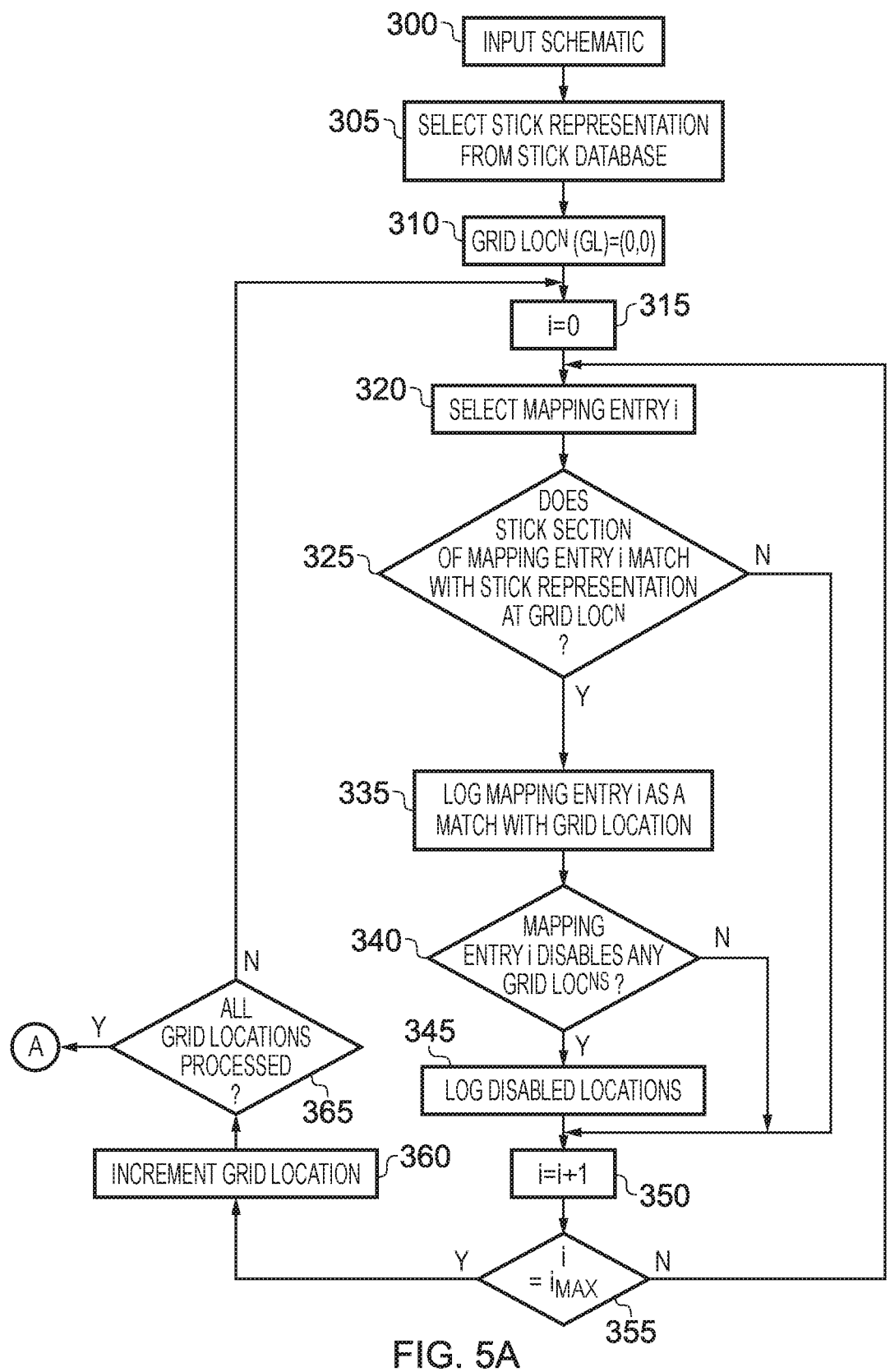
FIGS. 5A and 5B provide a flow diagram illustrating the operation of the system of FIG. 1, in accordance with one embodiment.
Figure 5B:
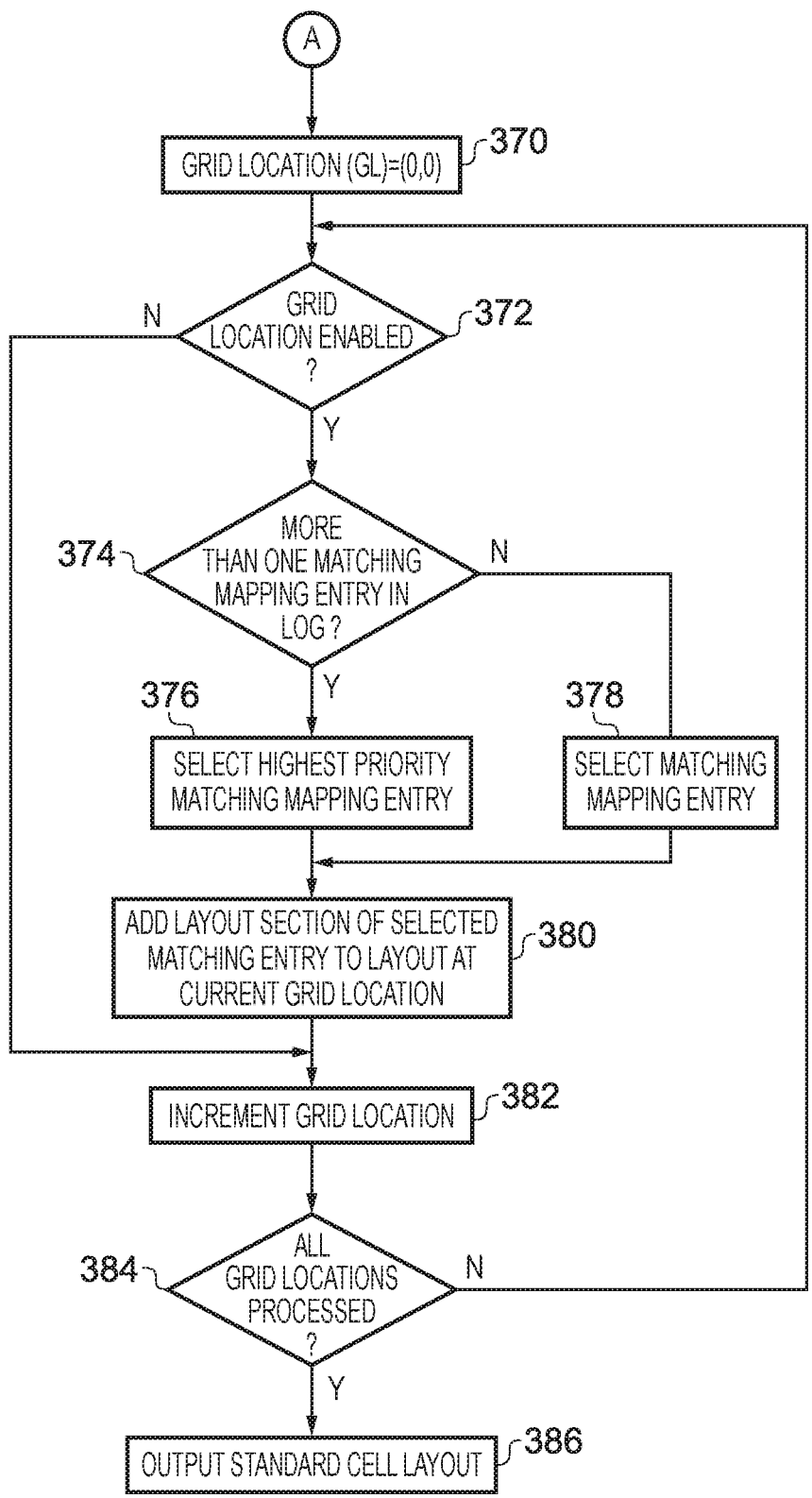

FIGS. 5A and 5B are flow diagrams illustrating the operation of the system of FIG. 1 in accordance with one embodiment. At step 300, a schematic is input to the standard cell generator 30, whereafter at step 305 the standard cell generator accesses the stick database 20 in order to select an appropriate stick representation for that schematic. Thereafter, a grid location parameter is initialised to an initial value (in this example 0,0) at step 310. At step 315, another parameter i is set equal to 0, whereafter at step 320 mapping entry i is selected from the mapping database 40. Whilst it does not matter in which order the mapping entries are analysed (e.g. from the lowest priority entry to the highest priority entry, or from the highest priority entry to the lowest priority entry), for the purposes of discussion it will be assumed that the analysis starts with the highest priority mapping entry.

At step 325, it is determined whether the stick section of the mapping entry i matches with the stick representation at the grid location. If not, the process proceeds directly to step 350 where the parameter i is incremented, and if the value of i does not yet equal some maximum value indicating that all grid locations have been evaluated (as determined at step 355), the process will then return to step 320 to cause the process to be repeated for the next mapping entry.

If at step 325 a match is detected, then at step 335 mapping entry i is added to a log in association with the current grid location to identify that that mapping entry is a match for the grid location, whereafter the process proceeds to step 340.

At step 340, it is determined whether the mapping entry i identifies any grid locations that should be disabled as a result of that mapping entry being used as a matching mapping entry. In particular it is possible for a mapping entry to include data identifying certain grid locations that will be disabled if that mapping entry is used at a matching mapping entry, which hence enables that mapping entry to specify a relatively large layout section which, once added to the layout, will remove the need for one or more adjacent grid locations to introduce any further layout. If not, the process proceeds to step 350, but otherwise the process proceeds to step 345 where the above mentioned log is populated to identify any disabled grid locations.

Via steps 350 and 355, the above process is then repeated for every mapping entry, whereafter the process proceeds to step 360 where the grid location is incremented. Assuming all grid locations have not yet been processed (as determined at step 365), the entirety of the above process is then repeated from step 315, to cause all of the mapping entries to be evaluated in respect of the new grid location. Once all grid locations have been processed, the process then branches to FIG. 5B.

Before discussing FIG. 5B, reference will be made to FIG. 6 which schematically illustrates the contents of the log 390 that will have been produced as a result of performance of the process of FIG. 5A. In particular, the log has an entry for each grid location, that entry identifying the grid location in the section 392, identifying any matching mapping entries in the section 394, and identifying whether the grid location is enabled or disabled in the section 396.

Considering now FIG. 5B, then at step 370 the grid location is again initialised, whereafter at step 372 it is determined with reference to the log 390 whether that grid location is enabled. If not, the process proceeds directly to step 382. However, if the grid location is enabled, it is then determined at step 374 whether more than one matching mapping entry is identified in the section 394 of the relevant entry within the log 390. In one embodiment, the mapping database 40 includes a number of low priority mapping entries whose stick sections are basic enough to ensure that there will always be at least one matching mapping entry for each grid location.

If there is only one matching mapping entry, then that single matching mapping entry identified in the log is selected at step 378, whereas in the event of multiple matching mapping entries, the highest priority matching mapping entry from amongst those matching mapping entries identified in the log is selected at step 376.

Thereafter, at step 380, the layout section identified within the selected matching entry of the mapping database 40 is added to the layout at the current grid location. Thereafter, at step 382 the grid location is incremented, and then at step 304 it is determined whether all grid locations have yet been processed. If not, the process loops back to step 372, but once all grid locations have been processed, then this indicates that the layout for the entire standard cell has now been produced, and accordingly that standard cell layout is output at step 386.

The mapping entries in the mapping database can be varied, such that a number of the entries have simple stick sections ensuring that at least one matching mapping entry will be found for any particular grid location, whilst other higher priority mapping entries have relatively complex stick sections, for example stick sections that ensure that that mapping entry will only match at one specific grid location. These latter high priority mapping entries hence allow very specific layout sections to be specified, and by this approach the very complex design rules associated with the emerging process technologies can be catered for. Further, as mentioned earlier, certain grid locations can be disabled in association with certain mapping entries. Hence, considering the example of a high priority mapping entry whose associated stick section will ensure that that mapping entry only matches at one specific grid location, a relatively large associated layout section may be specified in that mapping entry to identify a very specific format of layout to be reproduced at that grid location, and that layout may be such that no additional layout needs to be produced for one or more adjacent grid locations. Those adjacent grid locations can hence be disabled to prevent any additional layout being reproduced at those grid locations.

Figure 7:
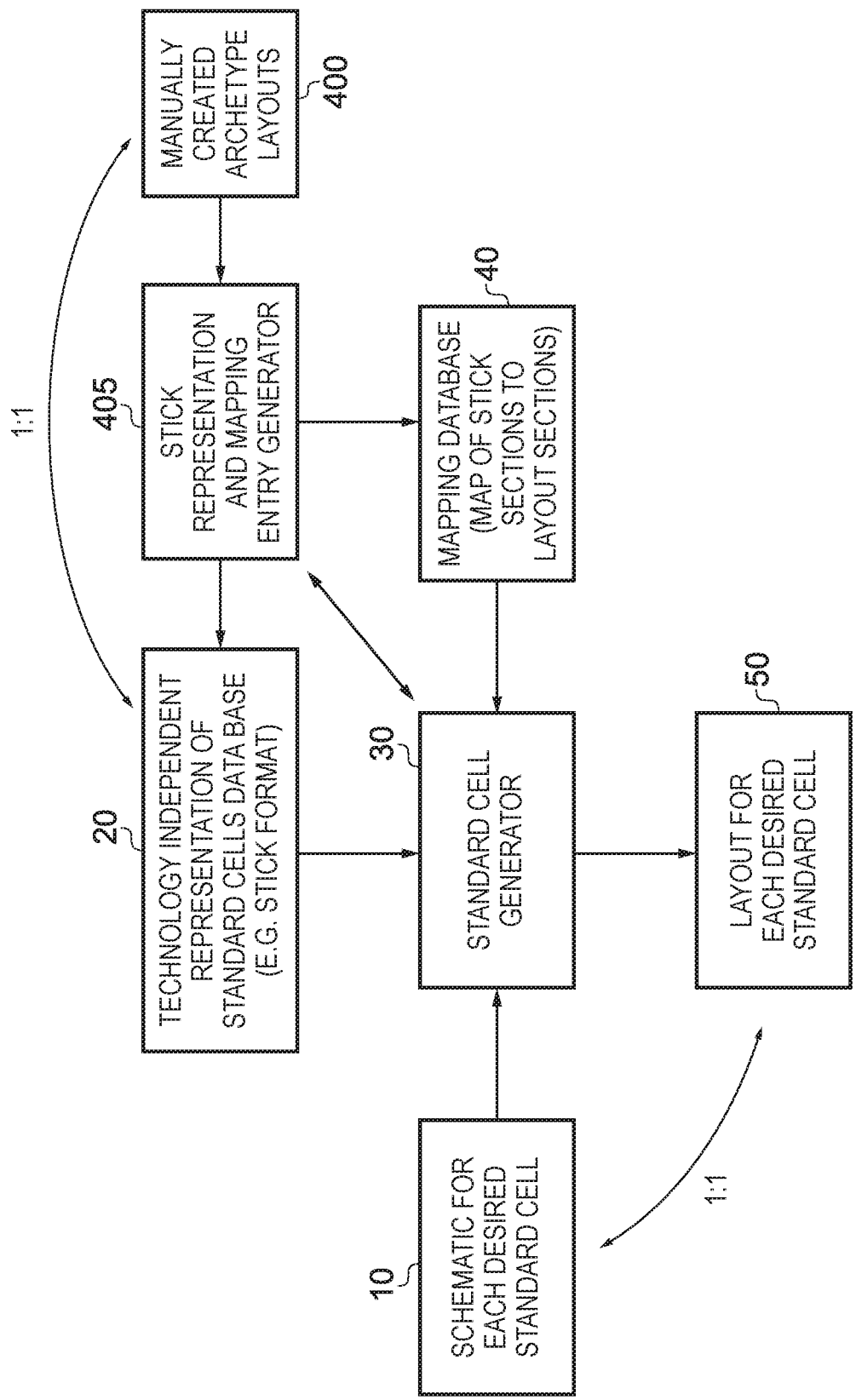
FIG. 7 illustrates a system in accordance with an alternative embodiment of the present invention, which incorporates an automated mechanism for populating the sticks database and mapping database.

Whilst the contents of the stick database 20 and the mapping database 40 can be populated manually, FIG. 7 illustrates an alternative embodiment where an additional generator tool 405 is used to populate one or both of the stick database 20 and the mapping database 40. In particular, the generator tool 405 receives manually created archetype layouts 400, and in one embodiment generates a stick diagram for insertion within the database 20 for every archetype layout 400 input to the tool. In addition, the tool 405 may then interact with the tool 30 to cause the tool 30 to generate a standard cell layout from the produced stick diagram, and by then subsequently comparing that produced standard cell layout with the archetype layout, the tool 405 can modify the contents of the mapping database, in particular by creating additional mapping entries and by altering the layout sections of one or more pre-existing mapping entries, as will be discussed in detail later with reference to FIGS. 10A to 10C. Whilst the stick representation and mapping entry generator 405 is shown as a separate component to the standard cell generator 30, in one embodiment both of these components can be provided within a single tool.

Figure 8:
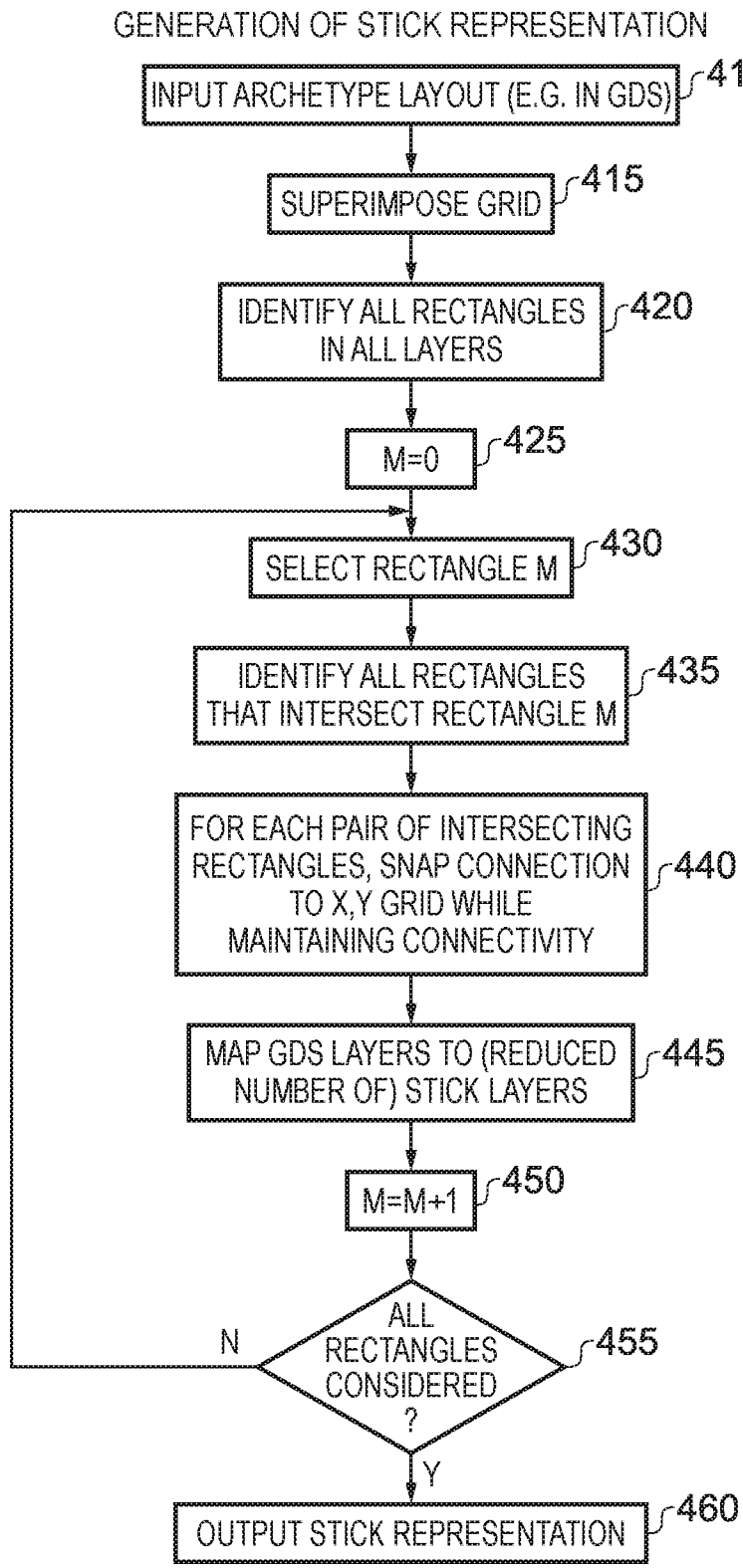
FIG. 8 is a flow diagram illustrating how stick representations may be generated in one embodiment of the system of FIG. 7.

FIG. 8 is a flow diagram illustrating how the stick representation and mapping entry generator 405 generates a stick representation from an input archetype layout 400. At step 410, the archetype layout is input to the generator 405. This will typically take the form of a data file, such as a GDS data file. At step 415, the generator tool 405 superimposes a grid on the archetype layout, whereafter at step 420 the tool identifies all regular-shaped sections within all of the layers in the archetype layout. As will be understood, typically all of the layout patterns in a GDS file are constructed using a series of rectangles, and accordingly in this embodiment at step 420 all such rectangles are identified in all of the layers. However, it will be appreciated that in other embodiments different shaped sections could be used and identified. Thereafter, at step 425, a parameter M is set equal to 0.

At step 430, rectangle M is selected, and then at step 435 all rectangles that intersect rectangle M are then identified. This will include both rectangles that intersect the rectangle in the same process layer, as well as any rectangles that intersect in a different process layer, due to a connection being provided between the rectangles in those two different process layers.

At step 440, for each pair of intersecting rectangles, the connection between those rectangles is snapped to the grid, such that the resulting connection point will be at one of the X, Y grid locations within the grid. In addition, whilst performing this snapping function, the connectivity is maintained whilst reducing the rectangles to the line format of the stick diagram. This process is shown schematically in FIG. 9.

Figure 9:
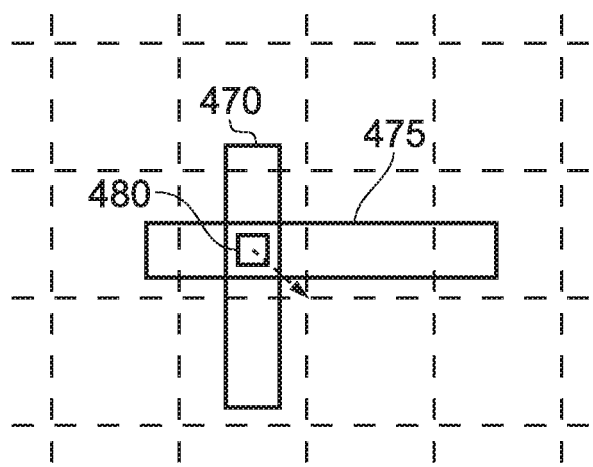
FIG. 9 schematically illustrates the process performed at step 440 of FIG. 8 in accordance with one embodiment.
Figure 9:
Figure 9:
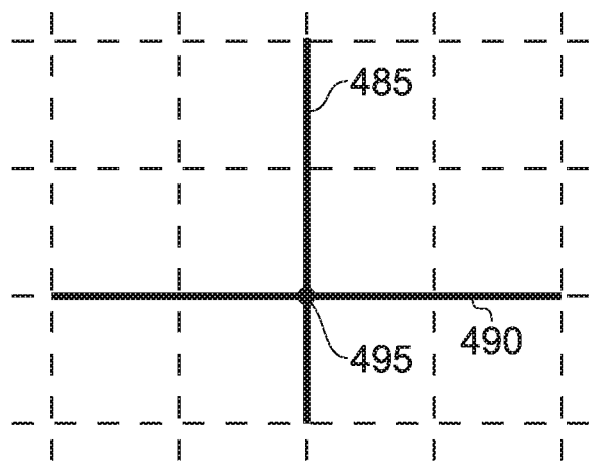

Accordingly, as shown in FIG. 9 a first rectangle 470 interconnects a second rectangle 475 at a connection 480. The connection 480 is snapped to the nearest grid location, as shown by the point 495. Further, the rectangle 470 is snapped outwards to the grid, to form the line 485, and similarly the rectangle 475 is snapped outwards to the grid to form the line 490.

At step 445, the various GDS layers are then mapped to the stick layers. As discussed previously, there will typically be more GDS layers than stick layers, and accordingly the stick features produced by the process of step 440 need to be mapped to the relevant stick layers. Hence, at this step the stick features generated with respect to two or more GDS layers may be consolidated into a single stick layer. Some GDS layers may be unnecessary to describe the stick features, and therefore will be unused when generating the stick features.

At step 450, the parameter M is incremented, whereafter it is determined whether all rectangles have been considered at step 455. If not, then the process returns to step 430. Once all rectangles have been considered, then the required stick representation will have been produced, and accordingly is output at step 460 for storing within the database 20. Although not specifically shown in FIG. 8, an optional step that may be taken prior to outputting the stick diagram is that, once the process of step 440 has been performed for all pairs of intersecting rectangles, then any spare portions of any of the lines that extend beyond a final connection point can be trimmed back to remove superfluous parts of the lines.

Figure 10A:
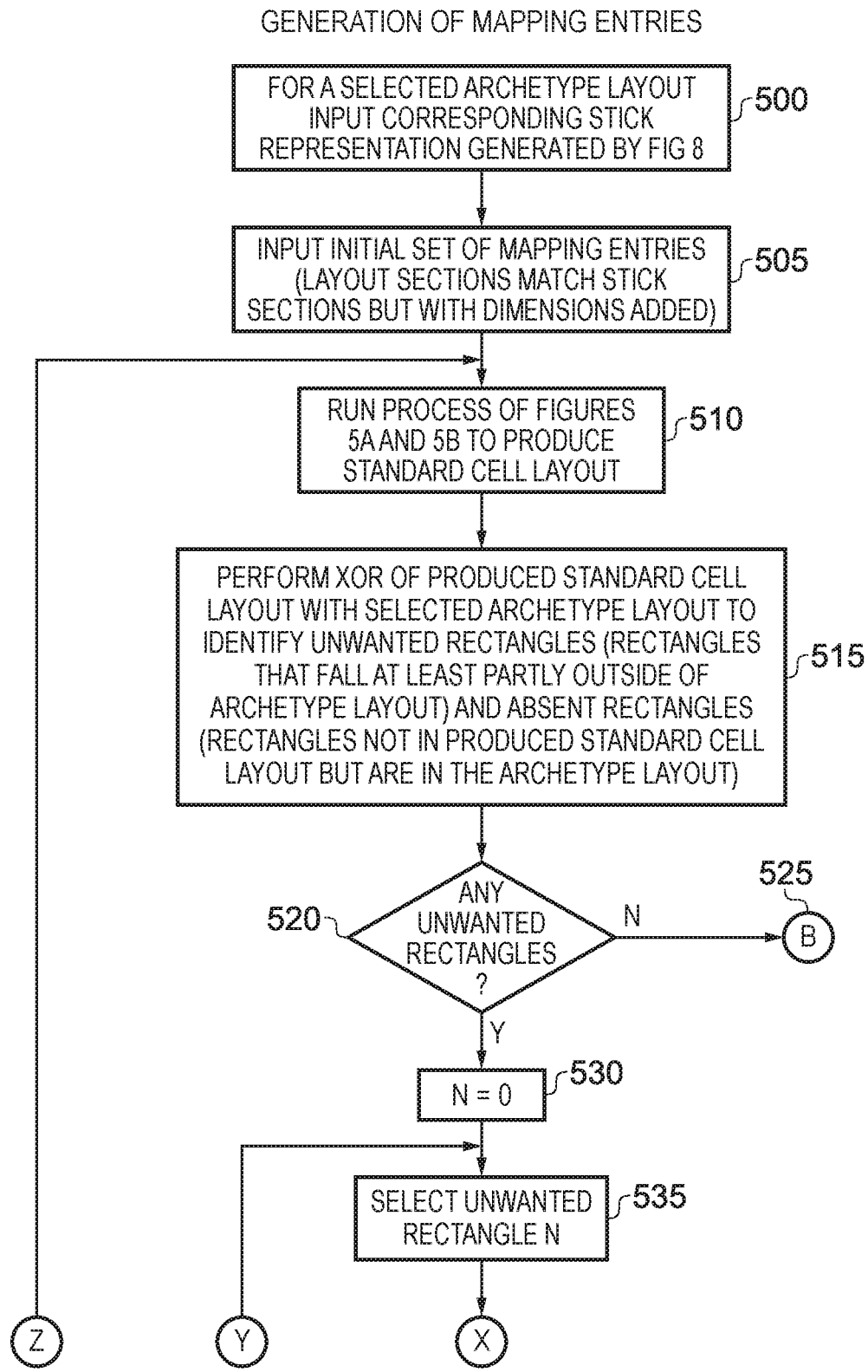
FIGS. 10A to 10C provide a flow diagram illustrating how the system of FIG. 7 is used to alter the contents of the mapping database in accordance with one embodiment.
Figure 10B:
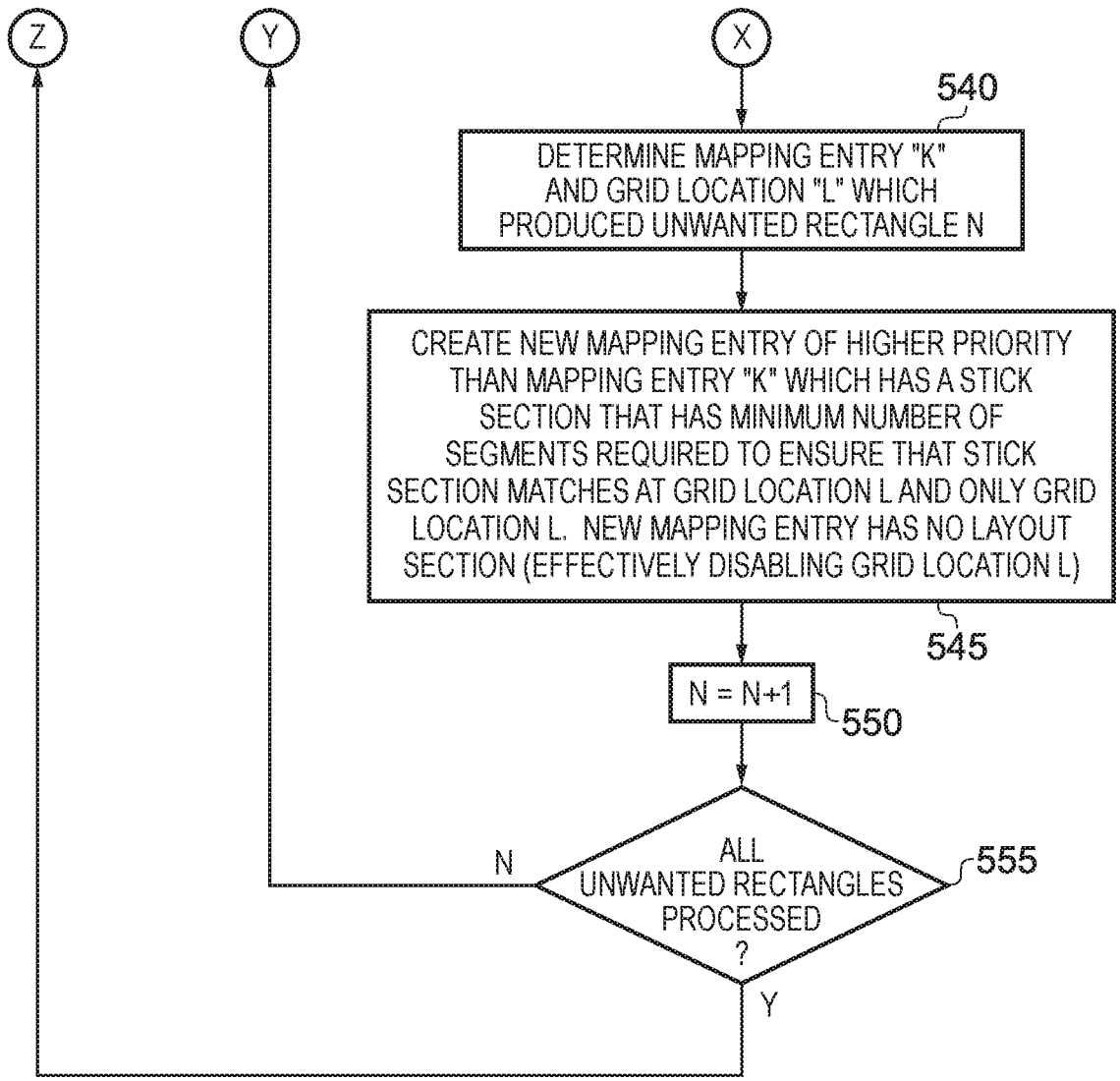
Figure 10C:
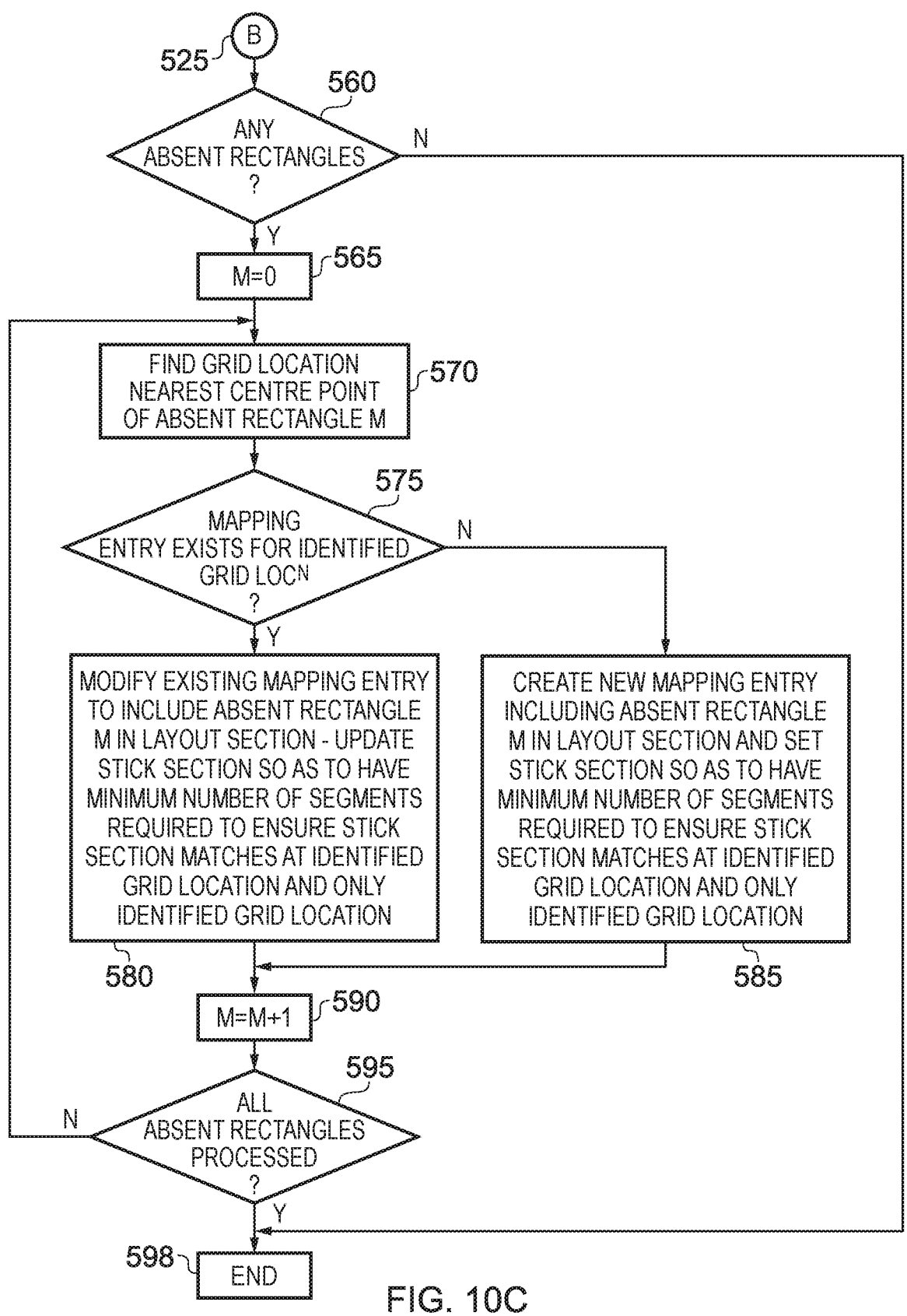

FIGS. 10A to 10C are flow diagrams illustrating how the stick representation and mapping entry generator 405 is used to alter the contents of the mapping database 40. In particular, through use of the archetype layouts 400 that are developed having regards to a particular process technology, the generator 405 can develop a mapping database whose mapping entries are specific to that process technology, and enable standard cells to be generated conforming to that process technology. This means that once a certain number of archetype layouts have been manually developed and verified as conforming to the particular process technology, a suitable mapping database 40 can then be generated, such that all subsequent required standard cells for that process technology can then be generated automatically using the standard cell generator 30.

As shown at step 500 in FIG. 10A, the mapping entry generator 405 causes the standard cell generator 30 to retrieve from the database 20 the stick diagram that the generator 405 generated from a particular input archetype layout 400.

The mapping database 40 is initialised with an initial set of mapping entries that are of a simple form, sufficient to allow a matching entry to be found for each grid location. In one embodiment, in these initial set of mapping entries, each mapping entry has a layout section that matches the corresponding stick section, but with dimensions added (to identify the length and width of the rectangles). At step 505, that initial set of mapping entries is input into the standard cell generator 30 from the mapping database 40.

Thereafter at step 510, the generator tool 30 performs the process of FIGS. 5A and 5B discussed earlier in order to produce a standard cell layout.

At step 515, the generator tool 405 then performs a logical XOR operation using as inputs both the produced standard cell layout output by the standard cell generator 30 and the original archetype layout 400. This enables any unwanted rectangles to be identified, namely rectangles that are present in the standard cell layout generated by the standard cell generator 30 from the stick diagram, but which fall at least partly outside of the rectangles in the archetype layout. In addition, this process will generate any absent rectangles, namely rectangles that are not in the standard cell layout produced by the standard cell generator 30 from the stick diagram, but which are in the archetype layout, and hence are required.

At step 520, it is then determined if there are any unwanted rectangles. If not, the process proceeds to point B 525, invoking the process of FIG. 10C discussed later. However, assuming there are some unwanted rectangles, then at step 530 the parameter N is set equal to 0, whereafter unwanted rectangle N is selected at step 535.

The process then proceeds to FIG. 10B, where the generator 405 interacts with the generator 30 in order to determine the mapping entry (referred to herein as mapping entry K) and the grid location (referred to herein as grid location L) which produced the unwanted rectangle within the standard cell layout output from the standard cell generator 30. Thereafter, the generator 405 creates, at step 545, a new mapping entry of a higher priority than mapping entry K, which has a stick section that has the minimum number of segments required to ensure that that stick section matches at the grid location L, and only at the grid location L within the stick diagram.

As illustrated in the earlier discussed FIG. 4B, a segment is either a connection point, or a line extending along the edge of a single grid. Hence the various stick sections illustrated in FIG. 4B have the number of segments identified against them in FIG. 4B. If the process of step 545 were to be performed specifically in respect of the grid location 160 discussed earlier with reference to FIG. 3, then it will be appreciated that a stick section of the form identified by the reference numeral 240 (having two segments) would represent the minimum number of segments required to ensure that that stick section only matches at grid location 160 within the stick diagram. The above is purely an example to illustrate the step performed at step 545.

In addition, at step 545, that new mapping entry is initialised to have no layout section. This effectively disables grid location L, since if the standard cell generator 30 were to re-run the process using the stick diagram, it would then insert no circuit layout in association with grid location L, and accordingly the unwanted rectangle would no longer appear.

Following step 545, then the parameter N is incremented at step 550, whereafter it is assessed whether all unwanted rectangles have been processed at step 555. If not, the process returns to step 535, to cause the earlier described process of steps 540 and 545 to be performed in respect of the next unwanted rectangle. Once all unwanted rectangles have been processed, the process returns to step 510. By use of the above described process, it is possible that one or more locations can become re-enabled (the disable is removed), and hence by returning to step 510 it can be ensured that the process is repeated until no unwanted shapes are found.

The process of FIGS. 5A and 5B is then re-run and the earlier described XOR operation re-performed, in order to determine whether there are still any unwanted rectangles. If there are, then the earlier described steps are re-performed. However, once it has been determined that the standard cell generator will produce from the stick diagram a standard cell layout which has no unwanted rectangles, then the process proceeds to point 525, where the process of FIG. 10C is then performed.

As shown in FIG. 10C, it is determined at step 560 whether there are any absent rectangles. If not, then the process proceeds directly to the end step 598, since at this point it has been verified that the standard cell generator is able to produce from the stick diagram, and using the current contents of the mapping database, a standard cell layout that conforms to the archetype layout, and hence conforms to the design rules of the process technology.

However, assuming there are one or more absent rectangles, then the process proceeds to step 565, where the parameter M is set equal to 0, whereafter at step 570 the grid location nearest the centre point of the absent rectangle M is identified.

At step 575, it is determined whether a matching mapping entry exists for the identified grid location, this for example being determinable with reference to the log 390 produced by the standard cell generator 30 during the performance of the process of FIG. 5A.

If a matching mapping entry does already exist, then the process proceeds to step 580, where that existing mapping entry is modified to include the absent rectangle M in the layout section. In addition, the stick section is updated so as to have the minimum number of segments required to ensure that the stick section matches at the identified grid location and only the identified grid location.

If at step 575 there was determined not to be any matching mapping entry for the identified grid location, then the process proceeds to step 585 where a new mapping entry is created that includes the absent rectangle M in the layout section. Again, the stick section for that new mapping entry is set so as to have the minimum number of segments required to ensure that that stick section matches at the identified grid location and only that identified grid location.

The process then proceeds to step 590 (or proceeds to step 590 from step 580 in the event that an existing mapping entry was modified), where the parameter M is incremented, whereafter at step 595 it is determined whether all absent rectangles have been processed. If not, the process returns to step 570. Once all absent rectangles have been processed, then the process ends at step 598. At this point, the contents of the mapping database will have been updated such that if the standard cell generator 30 generates a standard cell from the stick representation previously generated by the stick representation and mapping entry generator 405, this will produce a standard cell layout matching the archetype layout, and accordingly conforming to the design rules. Since the stick sections of the added/modified mapping entries only included the minimum number of segments to ensure that they match at only one grid location in the current stick diagram under consideration, then there is a prospect of those mapping entries also producing matches at grid locations in other future stick diagrams.

It has been found that once the above described stick generation and mapping entry generation processes have been performed for a certain number of archetype layouts, there are then sufficient stick diagrams in the stick database, and a sufficiently detailed set of mapping entries in the mapping database, to enable the standard cell generator 30 to then generate any required standard cell from an input schematic 10, with that standard cell conforming to the process technology.

Figure 11:
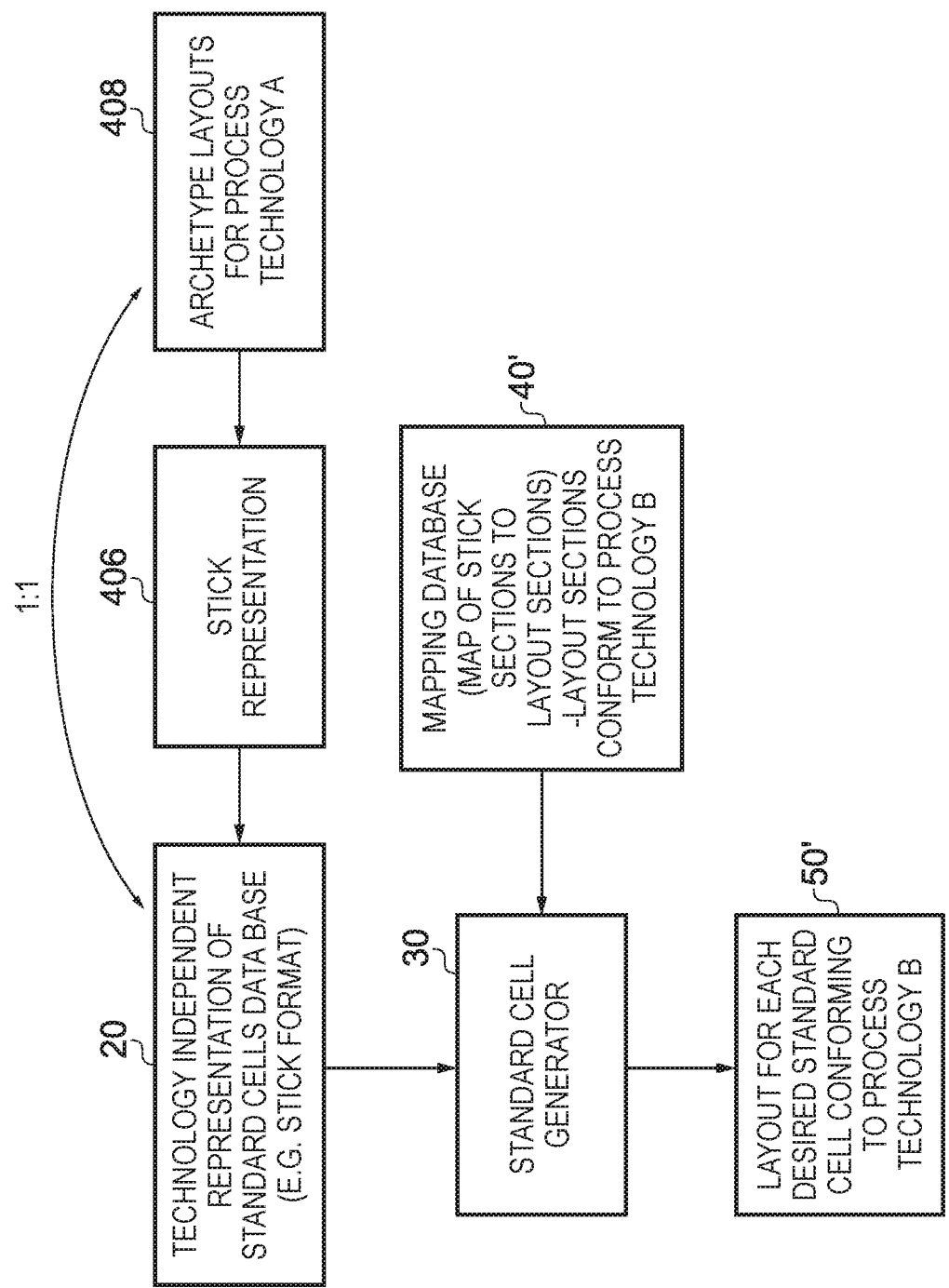
FIG. 11 illustrates a system in accordance with an alternative embodiment of the present invention, which provides an automated mechanism for technology migration.

FIG. 11 illustrates a system in accordance with an alternative embodiment of the present invention, which provides an automated mechanism for technology migration. A stick representation generator 406 is provided in order to generate a stick diagram for each of a set of archetype layouts 408, the generator 406 operating in the manner discussed earlier with reference to FIG. 8 when describing the generator 405 of FIG. 7. In this instance, the set 408 of archetype layouts conform to a process technology A, and the above process results in a corresponding set of process technology independent stick diagrams been produced for storage within the stick database 20.

In FIG. 11, the mapping database 40' comprises a plurality of mapping entries, where each mapping entry provides a stick format section, and an associated layout pattern section, where that layout pattern section conforms to a process technology B, which is different to process technology A. The standard cell generator 30 is then arranged, for each stick diagram in the database 20, to produce a corresponding layout using the contents of the mapping database, as a result of which a set of standard cell layouts will be produced that conform to the process technology B. Once this process has been completed, then for every input archetype layout conforming to process technology A, a corresponding layout will have been generated conforming to process technology B. As a result, it can be seen that the system of FIG. 11 provides an efficient, automated, mechanism for performing process technology migration.

Figure 12:
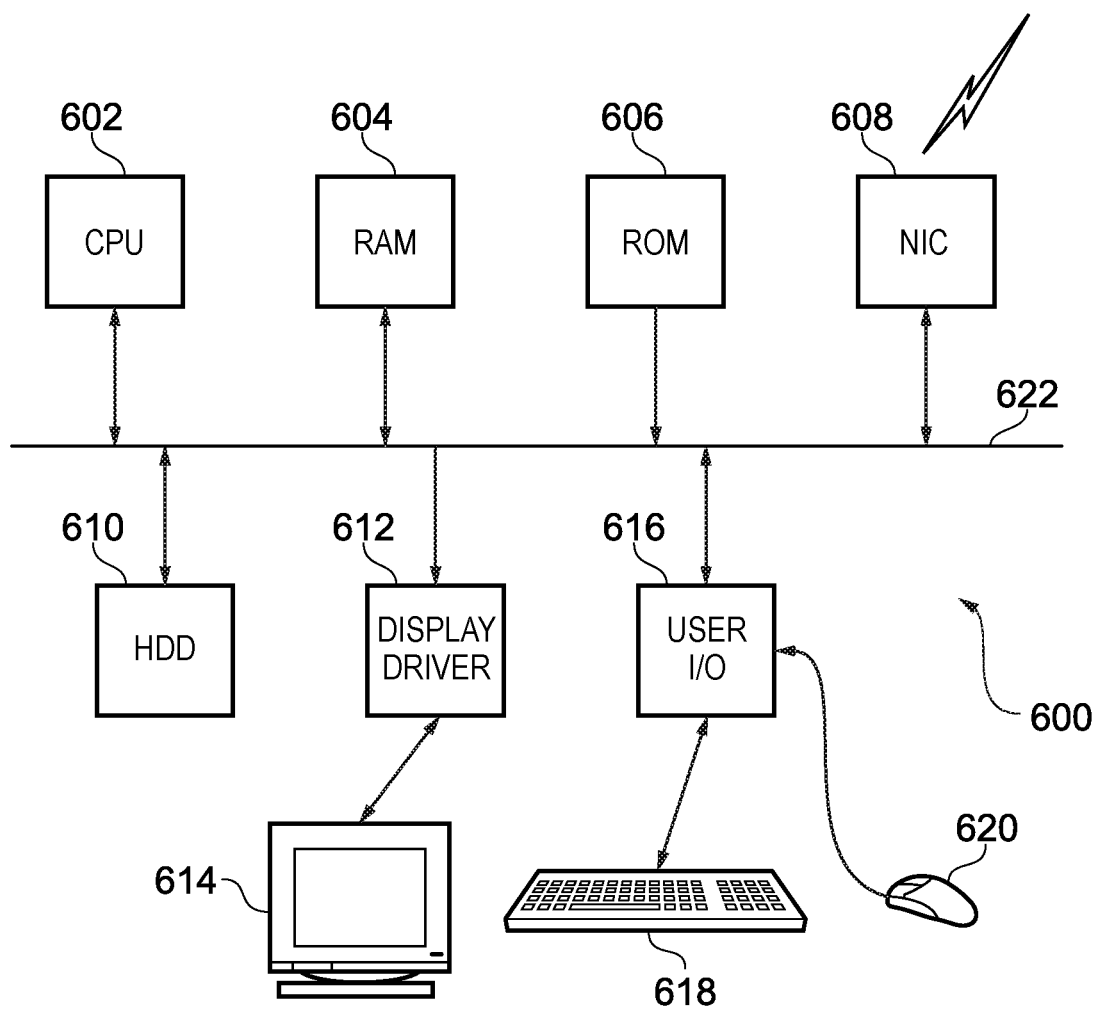
FIG. 12 schematically illustrates a general purpose computer of the type which can be used to implement the present techniques.
Figure 13:
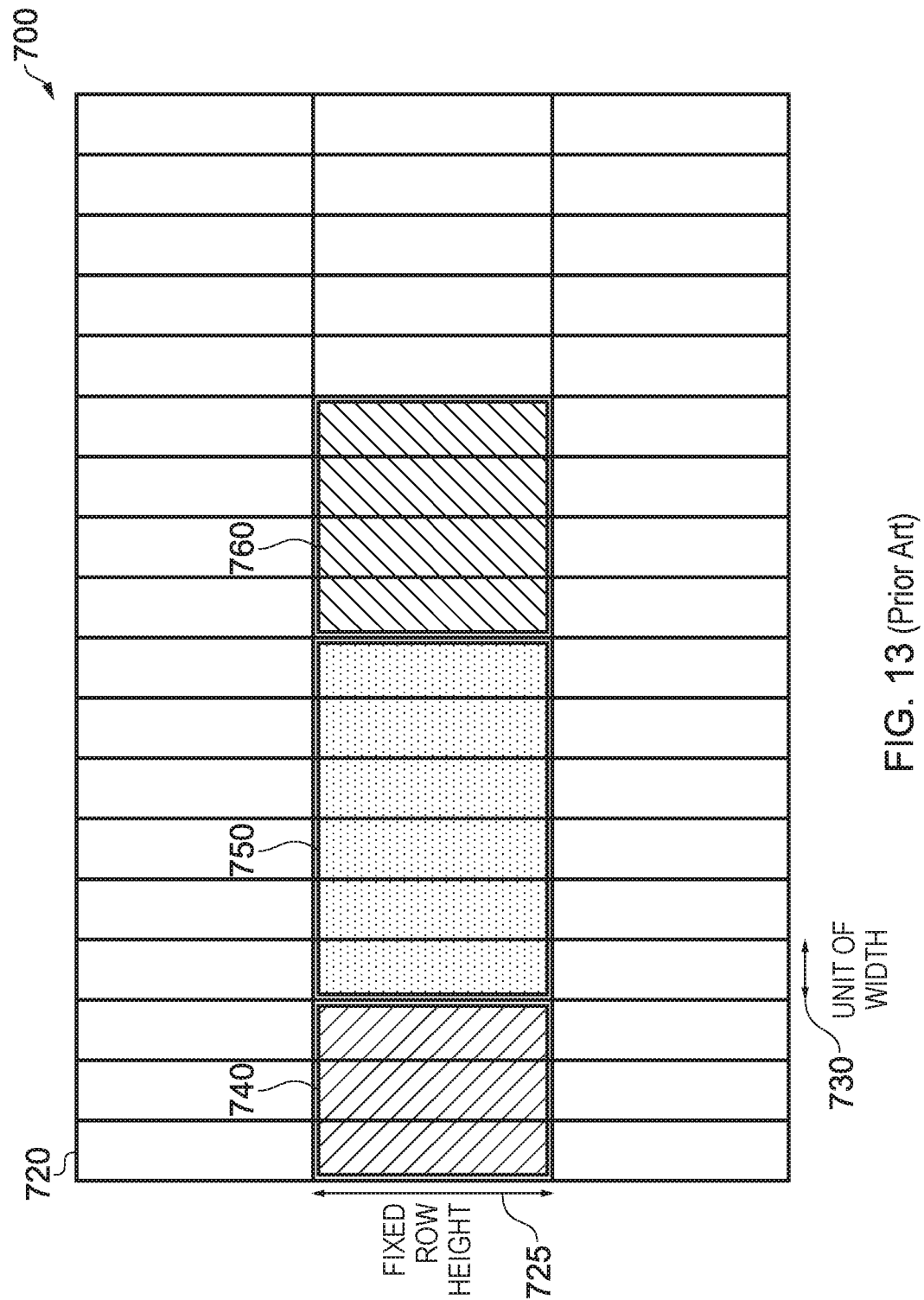
FIG. 13 is a diagram schematically illustrating how standard cells are placed within rows during the process of generating a layout for an integrated circuit.

FIG. 12 schematically illustrates a general purpose computer 600 of the type that may be used to implement the above described techniques, and in particular to perform the above described functions of the standard cell generator tool 30 and the stick representation and mapping entry generator 405. The general purpose computer 600 includes a central processing unit 602, a random access memory 604, a read-only memory 606, a network interface card 608, a hard disk drive 610, a display driver 612 and monitor 614, and a user input/output circuit 616 with a keyboard 618 and mouse 620 all connected via a common bus 622. In operation the central processing unit 602 will execute computer program instructions that may be stored in one or more of the random access memory 604, the read-only memory 606 and the hard disk drive 610, or dynamically downloaded via the network interface card 608. The results of the processing performed may be displayed to a user via the display driver 612 and the monitor 614. User inputs for controlling the operation of the general purpose computer 600 may be received via the user input/output circuit 616 from the keyboard 618 or the mouse 620. It will be appreciated that the computer program could be written in a variety of different computer languages. The computer program may be stored and distributed on a recording medium or dynamically downloaded to the general purpose computer 600. When operating under control of an appropriate computer program, the general purpose computer 600 can perform the above described techniques and can be considered to form an apparatus for performing the above described techniques. The architecture of the general purpose computer 600 could vary considerably, and FIG. 12 is only one example.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A method, comprising:
   generating first archetype layouts associated with first standard cells that conform to a process technology, wherein the first archetype layouts are generated with stick diagrams having rectangular sections along with absent rectangular sections;
   generating a database for the first archetype layouts, wherein the database has mapping entries associated with the process technology, and wherein the database has grid locations associated with the rectangular sections of the stick diagrams;
   determining if the mapping entries match the grid locations, wherein if the mapping entries match the grid locations, then modifying the mapping entries to include the absent rectangular sections in first archetype layouts; and
   automatically generating second archetype layouts associated with second standard cells for the database based on the mapping entries for the first archetype layouts, wherein the second archetype layouts associated with the second standard cells conform to the process technology.

2. The method of claim 1, wherein generating the first archetype layouts associated with the first standard cells includes manually developing and verifying the first archetype layouts associated with the first standard cells that conform to the process technology.

3. The method of claim 1, wherein the second archetype layouts of the second standard cells are different than the first archetype layouts of the first standard cells.

4. The method of claim 1, wherein the database comprises a mapping database, and wherein the method is performed by a mapping entry generator.

5. The method of claim 1, wherein automatically generating the second archetype layouts associated with the second standard cells includes automatically developing and verifying the second archetype layouts associated with the second standard cells.

6. A method, comprising:
receiving a stick diagram of a cell from a database, wherein the stick diagram of the cell is generated from an archetype layout of the cell, and wherein the stick diagram is defined within a grid array having grid locations;
receiving mapping entries of the cell from the database, wherein the mapping entries of the cell include layout sections associated with the cell that match corresponding stick sections associated with the stick diagram of the cell;
determining a mapping entry from the mapping entries of the cell and a grid location of the grid locations that define rectangular sections along with absent rectangular sections in the stick diagram;
determining if the mapping entry matches the grid location, wherein if the mapping entry matches the grid location, then modifying the mapping entry to include an absent rectangular section of the absent rectangular sections in the layout sections of the cell; and
automatically generating a new mapping entry for the database, wherein the new mapping entry has a higher priority than the mapping entry, wherein the new mapping entry has a stick section with segments that provide for the stick section matching the grid location within the stick diagram.

7. The method of claim 6, wherein the database comprises a mapping database having pre-existing mapping entries of the cell, and wherein the archetype layout of the cell defines the circuit component associated with the cell.

8. The method of claim 6, wherein defining rectangular sections includes:
generating a standard cell layout of the cell based on the stick diagram of the cell; and
comparing the standard cell layout of the cell with the archetype layout of the cell to identify rectangular sections in the stick diagram.

9. The method of claim 8, wherein identifying rectangular sections includes:
superimposing the grid array on the archetype layout of the cell;
identifying the rectangular sections that form the archetype layout of the cell; and
transforming the rectangular sections in the stick diagram into the segments that are snapped to the grid array to generate the stick diagram associated with the circuit component that defines the cell.

10. The method of claim 6, wherein the rectangular sections in the stick diagram include unwanted rectangular sections absent rectangular sections.

11. The method of claim 10, wherein:
the archetype layout and the standard cell layout are constructed with the rectangular sections,
the unwanted rectangular sections are in the standard cell layout but fall at least partly outside of the rectangular sections of the archetype layout, and
the absent rectangular sections are not in the standard cell layout but are in the archetype layout.

12. A method, comprising:
receiving a stick diagram of a cell from a database, wherein the stick diagram of the cell is generated from an archetype layout of the cell, and wherein the stick diagram is defined within a grid array having grid locations;
receiving mapping entries of the cell from the database, wherein the mapping entries of the cell include layout sections associated with the cell that match corresponding stick sections associated with the stick diagram of the cell;
determining a mapping entry from the mapping entries of the cell and a grid location of the grid locations that define rectangular sections in the stick diagram including absent rectangular sections;
determining whether the mapping entry matches the grid location;
if the mapping entry matches the grid location, then modifying the mapping entry to include an absent rectangular section of the absent rectangular sections in the layout sections associated with the cell, wherein the corresponding stick sections for the mapping entry is updated to include the segments that ensure the stick section matches the grid location within the stick diagram; and
if the mapping entry fails to match the grid location, then generating the new mapping entry with the absent rectangular section of the absent rectangular sections in the layout sections associated with the cell, wherein the corresponding stick sections for the new mapping entry is set to include the segments that ensure the stick section matches the grid location within the stick diagram; and
automatically generating a new mapping entry for the database, wherein the new mapping entry has a higher priority than the mapping entry, wherein the new mapping entry has a stick section with segments that provide for the stick section matching the grid location within the stick diagram.

13. The method of claim 6, wherein the archetype layout of the cell is associated with a first archetype layout of the cell that conforms to a target process technology, wherein the method further comprises:
automatically generating a second archetype layout of the cell for the database based on the new mapping entry, wherein the second archetype layout of the cell conforms to the target process technology.

14. A method, comprising:
obtaining an archetype layout of a cell from a database having pre-existing mapping entries of the cell, wherein the archetype layout of the cell defines a circuit component;
generating a stick diagram of the cell based on the archetype layout of the cell, the stick diagram defining rectangular sections along with absent rectangular sections, and the stick diagram defining grid locations based on the rectangular sections;

generating a standard cell layout of the cell based on the stick diagram of the cell;

comparing the standard cell layout of the cell with the archetype layout of the cell;

determining whether the pre-existing mapping entries match the grid locations, and if the pre-existing mapping entries match the grid locations, then modifying the pre-existing mapping entries to include the absent rectangular sections; and automatically modifying the database by generating additional mapping entries of the cell and by altering layout sections of the pre-existing mapping entries of the cell.

15. A method of claim 14, wherein the archetype layout of the cell provides a layout pattern of the cell for a target process technology, and wherein the stick diagram of the cell comprises a line drawing of the layout pattern of the cell that is process technology independent.

16. A method of claim 14, further comprising populating the database with the stick diagram of the circuit component as defined by the archetype layout of the cell.

17. A method of claim 14, wherein the archetype layout of the cell comprises a manually generated archetype layout of the cell.

18. A method of claim 14, further comprising providing the database with a priority ordered list of mapping entries, wherein each mapping entry of the priority ordered list of mapping entries stores a process technology independent layout section and a corresponding layout pattern section for a target process technology.

19. A method of claim 18, further comprising:
for selected grid locations within the grid array, performing a lookup operation in the database to determine a matching mapping entry,
wherein the matching mapping entry refers to a highest priority mapping entry within the priority ordered list having a process technology independent layout section that matches a portion of the stick diagram at the selected grid locations.

20. A method of claim 19, further comprising generating the archetype layout of the cell by incorporating, at the selected grid locations, a layout pattern section for the target process technology stored in the matching mapping entry.

* * * * *